(12) United States Patent
Fulop et al.

(10) Patent No.: US 10,189,204 B2
(45) Date of Patent: Jan. 29, 2019

(54) COMPOSITE FEEDSTOCK FOR ADDITIVE MANUFACTURING

(71) Applicant: Desktop Metal, Inc., Burlington, MA (US)

(72) Inventors: Ricardo Fulop, Lexington, MA (US); Michael Andrew Gibson, Boston, MA (US); Richard Remo Fontana, Cape Elizabeth, ME (US); Animesh Bose, Burlington, MA (US); Jonah Samuel Myerberg, Lexington, MA (US)

(73) Assignee: Desktop Metal, Inc., Burlington, MA (US)

( * ) Notice: Subject to any disclaimer, the term of this patent is extended or adjusted under 35 U.S.C. 154(b) by 0 days.

(21) Appl. No.: 15/842,783

(22) Filed: Dec. 14, 2017

(65) Prior Publication Data

US 2018/0162013 A1   Jun. 14, 2018

Related U.S. Application Data

(60) Provisional application No. 62/434,014, filed on Dec. 14, 2016, provisional application No. 62/489,271, (Continued)

(51) Int. Cl.
| | |
|---|---|
| *B29C 64/141* | (2017.01) |
| *B33Y 10/00* | (2015.01) |
| *B33Y 70/00* | (2015.01) |
| *B29C 47/00* | (2006.01) |
| *B29C 47/12* | (2006.01) |
| *C09D 125/06* | (2006.01) |
| *C09D 171/02* | (2006.01) |
| *C09D 133/12* | (2006.01) |
| *C09D 129/14* | (2006.01) |
| *C09D 123/12* | (2006.01) |
| *C09D 123/06* | (2006.01) |
| *C09D 7/61* | (2018.01) |
| *C09D 129/04* | (2006.01) |
| *B33Y 80/00* | (2015.01) |

(Continued)

(52) U.S. Cl.
CPC .......... *B29C 64/141* (2017.08); *B22F 3/1055* (2013.01); *B29B 11/10* (2013.01); *B29B 11/16* (2013.01); *B29C 47/0004* (2013.01); *B29C 47/0038* (2013.01); *B29C 47/12* (2013.01); *B29C 64/118* (2017.08); *B29C 64/165* (2017.08); *B29C 64/35* (2017.08); *B29C 64/40* (2017.08); *B33Y 10/00* (2014.12); *B33Y 40/00* (2014.12); *B33Y 70/00* (2014.12); *B33Y 80/00* (2014.12); *C08L 29/04* (2013.01); *C08L 29/14* (2013.01); *C09D 7/61* (2018.01); *C09D 123/06* (2013.01); *C09D 123/12* (2013.01); *C09D 125/06* (2013.01); *C09D 129/04* (2013.01); *C09D 129/14* (2013.01); *C09D 133/12* (2013.01); *C09D 171/02* (2013.01); *B29K 2025/06* (2013.01); *B29K 2105/253* (2013.01); *B29K 2995/0088* (2013.01); *C08L 2205/02* (2013.01)

(58) Field of Classification Search
CPC ..... B29C 64/141; B29C 64/118; B29C 64/35; B29C 64/40; B29C 64/165; B29C 47/0004; B29C 47/0038; B29C 47/12; B33Y 10/00; B33Y 40/00; B33Y 70/00; B33Y 80/00; C09D 7/61; C09D 123/06; C09D 123/12; C09D 125/06; C09D 129/04; C09D 129/14; C09D 133/12; C09D 171/02
USPC ........................................................ 428/403
See application file for complete search history.

(56) References Cited

U.S. PATENT DOCUMENTS

| | | |
|---|---|---|
| 5,204,055 A | 4/1993 | Sachs et al. |
| 5,738,817 A | 4/1998 | Danforth et al. |

(Continued)

FOREIGN PATENT DOCUMENTS

| | | | |
|---|---|---|---|
| EP | 3117982 | | 1/2017 |
| WO | WO2013/118009 | * | 8/2013 |

(Continued)

OTHER PUBLICATIONS

Schliecker, Gesine et al., "Characterization of a homologous series of d,l-lactic acid oligomers; a mechanistic study on the degradation kinetics in vitro", https://doi.org/10.1016/S0142-9612(03)00243-6; Biomaterials; vol. 24, Issue 21, Sep. 2003 , pp. 3835-3844.

(Continued)

*Primary Examiner* — Leszek B Kiliman
(74) *Attorney, Agent, or Firm* — Strategic Patents, P.C.

(57) ABSTRACT

Techniques and compositions are disclosed for composite feedstocks with powder/binder systems suitable for three-dimensional printing, such as fused filament fabrication. The composite feedstocks may include a jacket about a core, with at least the core including a powder material suspended in a binder system and the jacket having a hardness or toughness greater than a hardness or toughness of the core for the feedstock. In general, the harder jacket may protect the core from unintended deformation or damage during transportation, storage, or use. For example, the difference in hardness or toughness between the jacket and the core may facilitate gripping the feedstock (e.g., by gear drives or the like) with a higher amount of force than is otherwise applicable if the feedstock were composed of the core alone, without damaging the core, during a fused filament fabrication process or another additive manufacturing process.

25 Claims, 14 Drawing Sheets

Related U.S. Application Data filed on Apr. 24, 2017, provisional application No. 62/491,170, filed on Apr. 27, 2017.

(51) Int. Cl.

| | | |
|---|---|---|
| *B29C 64/165* | (2017.01) | |
| *B29C 64/118* | (2017.01) | |
| *B29B 11/10* | (2006.01) | |
| *B29B 11/16* | (2006.01) | |
| *B22F 3/105* | (2006.01) | |
| *B33Y 40/00* | (2015.01) | |
| *B29C 64/40* | (2017.01) | |
| *B29C 64/35* | (2017.01) | |
| *C08L 29/04* | (2006.01) | |
| *C08L 29/14* | (2006.01) | |
| *B29K 25/00* | (2006.01) | |
| *B29K 105/00* | (2006.01) | |

(56) References Cited

U.S. PATENT DOCUMENTS

| | | | |
|---|---|---|---|
| 5,900,207 A | 5/1999 | Priedeman, Jr. et al. | |
| 6,582,651 B1 | 6/2003 | Cochran, Jr. et al. | |
| 9,327,448 B2 | 5/2016 | Shah et al. | |
| 10,087,332 B2 | 10/2018 | Connor et al. | |
| 2010/0001226 A1* | 1/2010 | Aramaki | B22F 3/22 252/62.55 |
| 2010/0163270 A1* | 7/2010 | Hawkes | B21C 23/30 174/108 |
| 2013/0216420 A1* | 8/2013 | Li | B22F 3/1021 419/6 |
| 2015/0035209 A1 | 2/2015 | Shah et al. | |
| 2015/0080495 A1 | 3/2015 | Heikkila | |
| 2015/0232667 A1* | 8/2015 | Pompe | C08L 91/06 524/221 |
| 2018/0162044 A1 | 6/2018 | Gibson et al. | |
| 2018/0162047 A1 | 6/2018 | Gibson et al. | |
| 2018/0162048 A1 | 6/2018 | Gibson et al. | |

FOREIGN PATENT DOCUMENTS

| | | | |
|---|---|---|---|
| WO | WO-2013118009 | | 8/2013 |
| WO | WO2016/133510 | * | 8/2016 |
| WO | WO-2016133510 | | 8/2016 |
| WO | WO-2016198291 | | 12/2016 |
| WO | WO-2018112263 | | 6/2018 |

OTHER PUBLICATIONS

Prospector, "Styron 650 HF", www.ulprospector.com, Dec. 2013, 2 pages.

Park, Mansoo et al., "Accelerated sintering in phase-separating nanostructured alloys", Nature Communications | 6:6858 | DOI: 10.1038/ncomms7858, |www.nature.com/naturecommunications, Apr. 22, 2015, 6 pages.

boedeker.com, "Polystyrene Specifications", Boedeker Plastics: Polystyrene Datasheet, http://www.boedeker.com/polyst_p.htm, 2017, 2 pages.

Agrawal, Dinesh, "Microwave Sintering of Ceramics, Composites, Metals, and Transparent Materials", Journal of Materials Education vol. 19(4.5 & 6), 1997, 9 Pages.

ISA, "PCT Application No. PCT/US17/66526 International Search Report and Written Opinion dated Apr. 9, 2018", 11 pages.

Kukla, Christian et al., "Effect of Particle Size on the Properties of Highly-Filled Polymers for Fused Filament Fabrication", Jul. 2016, 5 pages.

Shah, Ramille N. et al., "3D-Printing of Energy Devices Using Particle-Based Inks", Northwestern University, Querrey Institute for BioNanotechnology Institute for Sustainability and Energy at Northwestern Aug. 2014 , 5 Pages.

Riecker, S. et al., "Fused Deposition Modeling—Opportunities for Cheap Metal AM", World PM2016—AM—Deposition Technologies 2016 , 6 Pages.

Burkhardt, Carlo et al., "Fused Filament Fabrication (FFF) of 316L Green Parts for the MIM process", World PM2016—AM—Deposition Technologies 2016 , 7 Pages.

Kukla, Christian et al., "Properties for PIM Feedstocks Used in Fused Filament Fabrication", World PM2016—AM—Deposition Technologies 2016 , 5 Pages.

Jakus, Adam E. et al., "Metallic Architectures from 3D-Printed Powder-Based Liquid Inks", Adv. Funct. Mater, DOI: 10.1002/adfm.201503921 2015 , pp. 6985-6995.

Hartkop, David , "MiniMetalMaker—3D print with metal clay", https://www.indiegogo.com/projects/minimetalmaker-3d-print-with-metal-clay#/ 2015 , 3 pages.

Krassenstein, Brian , "Mini Metal Maker, Affordable Metal Clay 3D Printer, Relaunches on Indiegogo to Fund Mass Production", https://3dprint.com/48292/mini-metal-maker-3d-print/ 2013 , 6 Pages.

Taylor, Shannon L. et al., "Iron and Nickel Cellular Structures by Sintering of 3D-Printed Oxide or Metallic Particle Inks", Advanced Engineering Materials, DOI: 10.1002/adem.201600365 Sep. 16, 2016 , 8 pages.

* cited by examiner

COMPOSITE FEEDSTOCK FOR ADDITIVE MANUFACTURING

CROSS-REFERENCE TO RELATED APPLICATIONS

This application claims priority to U.S. Prov. Pat. App. No. 62/434,014, filed on Dec. 14, 2016, U.S. Prov. Pat. App. No. 62/489,271, filed on Apr. 24, 2017, and U.S. Prov. Pat. App. No. 62/491,170, filed Apr. 27, 2017, with the entire contents of each of these applications hereby incorporated herein by reference.

This application is also related to International Pat. App. No. PCT/US17/66526, filed on Dec. 14, 2017, with the entire contents hereby incorporated herein by reference.

FIELD

The systems and methods described herein relate to additive manufacturing, and more specifically to additive manufacturing with powder/binder systems suitable for use with fused filament fabrication and other techniques.

BACKGROUND

Certain additive manufacturing techniques include extrusion of feedstock to form a three-dimensional object. Material requirements associated with handling feedstock for extrusion, however, may differ from or may be at least partially incompatible with material requirements for appropriate formation of the material of the feedstock into a high-quality part. Such differences in material requirements can particularly impact the usefulness of extrusion-based additive manufacturing techniques in forming metal objects. Thus, there remains a need for materials suitable for fabricating metal net shape objects using extrusion-based additive manufacturing techniques.

SUMMARY

Techniques and compositions are disclosed for three-dimensional printing with powder/binder systems including but not limited to metal injection molding powder materials, highly-filled polymer composites, and any other materials suitable for handling with various additive manufacturing techniques, and further suitable for subsequent debinding and thermal processing into a final object.

Techniques and compositions are disclosed for composite feedstocks with powder/binder systems suitable for three-dimensional printing, such as fused filament fabrication. The composite feedstocks may include a jacket about a core, with at least the core including a powder material suspended in a binder system and the jacket having a hardness or toughness greater than a hardness or toughness of the core for the feedstock. In general, the harder jacket may protect the core from unintended deformation or damage during transportation, storage, or use. For example, the difference in hardness or toughness between the jacket and the core may facilitate gripping the feedstock (e.g., by gear drives or the like) with a higher amount of force than is otherwise applicable if the feedstock were composed of the core alone, without damaging the core, during a fused filament fabrication process or another additive manufacturing process.

In one aspect, a feedstock for additive manufacturing disclosed herein includes a core including a binder system and a powder material suspended in the binder system, the powder material including a sinterable powder, the binder system including a primary binder and a secondary binder, a net shape of the powder material retainable by the primary binder during a primary debind process, a net shape of the powder material retainable by the secondary binder during a thermal sintering cycle, and at least one of the primary binder and the secondary binder including a first polymer. The feedstock may also include jacket about the core, the jacket including a second polymer, and the jacket having a mechanical performance greater than a mechanical performance of the core at a temperature substantially below an extrusion temperature for the feedstock.

The mechanical performance of the core and jacket may be measured by any one of the: area under a curve of a stress-strain test, a shore hardness, a Rockwell hardness, an Izod impact energy, a Charpy impact energy, and a tensile yield strength, and a tensile ultimate strength. The powder material may have a concentration in the core within ±10 volume percent of a tap density of the powder material. The second polymer may have a molecular weight greater than a molecular weight of the first polymer. The binder system may include two or more polymers, where the second polymer has a molecular weight greater than an average of the molecular weights of the two or more polymers in the binder system. The binder system may include the second polymer. The second polymer may have a Shore D hardness greater than a Shore D hardness of the first polymer at the temperature substantially below the extrusion temperature of the feedstock. The second polymer may have a melt temperature higher than a melt temperature of the first polymer. At a temperature of about twenty-three degrees Celsius, the feedstock may be spoolable without fracture on a spool with a diameter of at most thirty-six inches and at least about a diameter of the feedstock. At a temperature of about twenty-three degrees Celsius, the feedstock may be substantially rigid. The second polymer of the jacket may have a polymer chain longer than a polymer chain of the first polymer of the binder system. The jacket may contain an amount of the powder material. A volumetric percentage of the powder material in the jacket may be less than a volumetric percentage of the powder material in the core. A volumetric percentage of the powder material in the jacket may be substantially equal to a volumetric percentage of the powder material in the core. The secondary binder may be formed in part by the second polymer, and a volumetric percentage of the second polymer in the jacket may be greater than a volumetric percentage of the second polymer in the core. The first polymer may be polystyrene. The second polymer may be one or more of polystyrene, polypropylene, polyethylene, and poly(methyl methacrylate). The secondary binder may include one or more of polypropylene, polyethylene, and poly(methyl methacrylate).

In another aspect, a method disclosed herein includes extruding a continuous core including a binder system and a powder material, the powder material having a concentration in the continuous core within ±10 volume percent of a tap density of the powder material, the binder system including a primary binder and a secondary binder, a net shape of the powder material retainable by the primary binder during a primary debind process, and a net shape of the powder material retainable by the secondary binder during a thermal sintering cycle, at least one of the primary binder and the secondary binder including a first polymer, and the powder of the powder material including a sinterable powder, and forming a jacket of a jacket material about the continuous core.

At about twenty-three degrees Celsius, the jacket material may have a Shore hardness greater than a Shore hardness of the continuous core. The binder system may include a low molecular weight polymer, the jacket may include a crosslinker for the low molecular weight polymer, and a polymerization of the low molecular weight polymer may be triggerable by the crosslinker to form longer chain polymers at an extrusion temperature for the feedstock. The low molecular weight polymer may have a molecular weight no greater than one hundred thousand g/mol. The extrusion temperature may be at least one hundred degrees Celsius. Forming the jacket may include coextruding the jacket material around the continuous core. Forming the jacket may include spraying the jacket material onto the continuous core or dipping the continuous core in the jacket material.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DESCRIPTION

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, unless otherwise specified or made clear from the context, the term "or" should generally be understood to mean "and/or" and, similarly, the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

Figure 1:
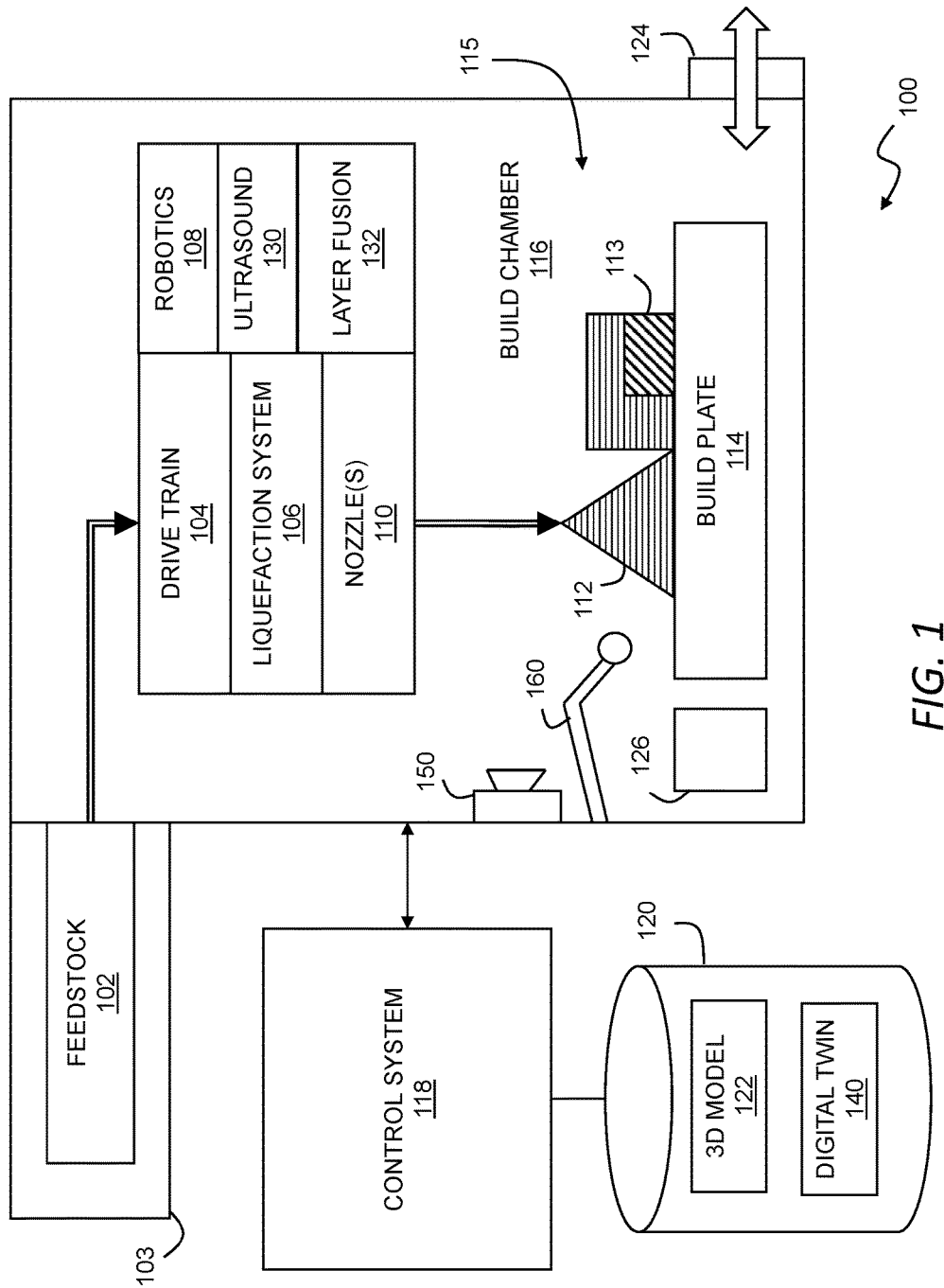
FIG. 1 is a block diagram of an additive manufacturing system for use with composites.

FIG. 1 is a block diagram of an additive manufacturing system for use with composites. The additive manufacturing system may include a three-dimensional printer 100 (or simply printer 100) that deposits metal using fused filament fabrication. Fused filament fabrication is well known in the art and, with suitable adaptations described in greater detail below, may be usefully employed for additive manufacturing to accommodate the forces, temperatures and other environmental requirements typical of the metallic injection molding materials contemplated herein. In general, the printer 100 may include a feedstock 102 propelled by a drive train 104 and heated to a workable state by a liquefaction system 106, and then dispensed through one or more nozzles 110. By concurrently controlling a robotic system 108 to position the one or more nozzles 110 along an extrusion path, an object 112 may be fabricated on a build plate 114 within a build chamber 116. In general, a control system 118 manages operation of the printer 100 to fabricate the object 112 according to a three-dimensional model using a fused filament fabrication process or the like.

A variety of commercially available compositions have been engineered for metal injection molding ("MIM"). These highly engineered materials can also be adapted for use as a feedstock 102 in printing techniques such as fused filament fabrication. For example, MIM feedstock materials, when suitably shaped, may be usefully extruded through nozzles typical of commercially available FFF machines, and are generally flowable or extrudable within typical operating temperatures (e.g., 160-250 degrees Celsius) of such machines. This temperature range may depend on the binder—e.g., some binders achieve appropriate viscosities at about 205 degrees Celsius, while others achieve appropriate viscosities at lower temperatures such as about 160-180 C degrees Celsius. One of ordinary skill will recognize that these ranges (and all ranges listed herein) are provided by way of example and not of limitation. Further, while there are no formal limits on the dimensions for powder metallurgy materials, parts with dimensions of around 100 millimeters on each side have been demonstrated to perform well for FFF fabrication of net shape green bodies. Any smaller dimensions may be usefully employed, and larger dimensions may also be employed provided they are consistent with processing dimensions such as the print resolution and the extrusion orifice diameter. For example, implementations target about a 0.300 μm diameter extrusion, and the MIM metal powder may typically be about 1~22 μm diameter, although nano-sized powders can be used. The term "metal injection molding material," as used herein, is intended to include any such engineered materials, as well as other fine powder bases such as ceramics in a similar binder suitable for injection molding. Thus, where the term metal injection molding or the commonly used abbreviation, MIM, is used, this should be understood to include injection molding materials using powders other than, or in addition to, metals, and all such materials are intended to fall within the scope of this disclosure unless a different meaning is explicitly provided or otherwise clear from the context. Also, any reference to "MIM materials," "powder metallurgy materials," "MIM feedstocks," or the like shall generally refer to a powder of one or more metals, metal alloys, and/or ceramics mixed with one or more binding materials, e.g., a backbone binder that holds everything together and a bulk binder that carries the metal and backbone into position within a mold or print, unless a different meaning is explicitly provided or otherwise clear from the context. It should also be appreciated that other material systems may be suitable for fabricating metal parts using fabrication techniques such as stereolithography or binder jetting, some of which are discussed in greater detail below. As used herein, unless otherwise specified or made clear from the context, the term "backbone binder" shall be used interchangeably with the term "secondary binder," and the term "bulk binder" shall be used interchangeably with the term "primary binder."

In general, fabrication of such materials may proceed as with a conventional FFF process, except that after the net shape is created, the green part may be optionally machined or finished while in a more easily workable state, and then debound and sintered into a final, dense object using any of the methods common in the art for MIM materials. The final object once again may include a metal, a metal alloy, a ceramic, or another suitable combination of materials.

The feedstock 102 may be fed from a carrier 103 to dispense the feedstock 102 to the three-dimensional printer either in a continuous (e.g., wire) or discrete (e.g., billet) form. The feedstock 102 may, for example, be supplied in discrete units one by one as billets or the like into an intermediate chamber for delivery into the build chamber 116 and subsequently melted for deposition. In another aspect, the carrier 103 may include a spool or cartridge containing the feedstock 102 in an elongate form, such as in the form of a wire. Where a vacuum or other controlled environment is desired, the feedstock 102 may be fed through a vacuum gasket into the build chamber 116 in a continuous fashion. Thus, in one aspect, there is disclosed herein an apparatus including a MIM feedstock in the shape of a wire, the feedstock including an engineered composite of metal powder and a polymeric binder or the like, where the carrier 103 may dispense the build material in a continuous feed to the build chamber 116. For environmentally sensitive materials, the carrier 103 may provide a vacuum environment for the feedstock 102 that can be directly or indirectly coupled to the vacuum environment of the build chamber 116. More generally, the build chamber 116 (and the carrier 103) may maintain any suitably inert environment for handling of the feedstock 102, such as a vacuum, and oxygen-depleted environment, an inert gas environment, or some gas or combination of gasses that are not reactive with the feedstock 102, where such conditions are necessary or beneficial for three-dimensional fabrication.

A drive train 104 may include any suitable gears, compression pistons, or the like for continuous or indexed feeding of the feedstock 102 into the liquefaction system 106. In one aspect, the drive train 104 may include gear shaped to mesh with corresponding features in the feedstock 102, such as ridges, notches, or other positive or negative detents. In another aspect, the drive train 104 may include heated gears or screw mechanisms to deform and engage with the feedstock 102. Thus, there is disclosed in one aspect a printer for a fused filament fabrication process that heats a feedstock to a working temperature, and that heats a gear that engages with, deforms, and drives the feedstock in a feed path. A screw feed may also or instead be used.

For more brittle MIM materials, a fine-toothed drive gear of a material such as a hard resin or plastic may be used to grip the feedstock without excessive cutting or stress concentrations that might otherwise crack, strip, or otherwise compromise the feedstock.

In another aspect, the drive train 104 may include bellows, or any other collapsible or telescoping press to drive rods, billets, or similar units of the feedstock 102 into the liquefaction system 106. Similarly, a piezoelectric or linear stepper drive may be used to advance a unit of the feedstock 102 in a non-continuous, stepped method with discrete, high-powered mechanical increments. In another aspect, the drive train 104 may include multiple stages. In a first stage, the drive train 104 may heat the feedstock 102 and form threads or other features that can supply positive gripping traction into the feedstock 102. In the next stage, a gear or the like matching these features can be used to advance the feedstock 102 along the feed path. A collet feed may be used (e.g., similar to those on a mechanical pencil) in certain instances. A soft wheel or belt drive may also or instead be used. In an aspect, a shape forming wheel drive may be used to ensure accuracy of size and thus the build. More generally, the drive train 104 may include any mechanism or combination of mechanisms used to advance the feedstock 102 for deposition in a three-dimensional fabrication process. Thus, the term "drive train" should be interpreted in the broadest sense, unless a more specific meaning is explicitly provided or otherwise clear from the context.

The liquefaction system 106 may heat the feedstock 102 to a working temperature in a range suitable for extrusion in a fused filament fabrication process. Any number of heating techniques may be used. In one aspect, electrical techniques such as inductive or resistive heating may be usefully applied to liquefy the feedstock 102. This may, for example include inductively or resistively heating a chamber around the feedstock 102 to a temperature at or near the glass transition temperature of the feedstock 102, or some other temperature at which a binder or other component of the feedstock 102 becomes workable, extrudable, or flowable for deposition as contemplated herein. In instances in which the feedstock 102 is sufficiently conductive, the feedstock 102 may be directly heated through contact methods (e.g., resistive heating with applied current) or non-contact methods (e.g., induction heating using an external electromagnet to drive eddy currents within the feedstock 102). The choice of additives for use in the feedstock 102 may further be advantageously selected to provide bulk electrical characteristics (e.g., conductance/resistivity) to improve heating. When directly heating the feedstock 102, it may be useful to model the shape and size of the feedstock 102 to better control electrically-induced heating. The model may, for example, include estimates or actual measurements of shape, size, mass, etc.

It will also be appreciated that, as used herein, "liquefaction" does not require complete liquefaction. That is, the media to be used in printing may be in a multi-phase state, and/or form a paste or the like having highly viscous and/or non-Newtonian fluid properties. Thus, the liquefaction system 106 described herein should be understood to more generally include any system that places a feedstock 102 in condition for use in fabrication as contemplated herein.

To facilitate resistive heating of the feedstock 102, one or more contact pads, probes or the like may be positioned within the feed path for the feedstock 102 to provide locations for forming a circuit through the feedstock 102 at the appropriate location(s). To facilitate induction heating, one or more electromagnets may be positioned at suitable locations adjacent to the feed path and operated, e.g., by the control system 118, to heat the feedstock 102 internally through the creation of eddy currents. In one aspect, both of these techniques—resistive heating and inductive heating—may be used concurrently to achieve a more tightly controlled or more evenly distributed electrical heating within the build material. The printer 100 may also be instrumented to monitor the resulting heating in a variety of ways. For example, the printer 100 may monitor power delivered to the inductive or resistive circuits. The printer 100 may also or instead measure temperature of the feedstock 102 and/or surrounding environment at any number of locations. In another aspect, the temperature of the feedstock 102 may be inferred by measuring, for example, the amount of force required to drive the feedstock 102 through the one or more nozzles 110 or another portion of the feed path. The force may be used as a proxy for the viscosity of the feedstock 102. More generally, any techniques suitable for measuring temperature or viscosity of the feedstock 102 and responsively controlling applied electrical energy may be used to control liquefaction for a fabrication process using composites as contemplated herein.

The liquefaction system 106 may also or instead include any other heating systems suitable for applying heat to the feedstock 102 to a suitable temperature for extrusion. This may, for example, include techniques for locally or globally augmenting heating using any one or more of chemical heating, combustion, ultrasound heating, laser heating, electron beam heating, or other optical, thermal, or mechanical heating techniques.

The liquefaction system 106 may include a shearing engine. The shearing engine may create shear within the feedstock 102, as the feedstock 102 is heated, to maintain a mixture of the metallic base and a binder or other matrix, or to maintain a mixture of various materials in a paste or other build material. A variety of techniques may be employed by the shearing engine. In one aspect, the feedstock 102 may be axially rotated as it is fed along the feed path into the liquefaction system 106. In another aspect, one or more ultrasonic transducers may be used to introduce shear within the heated feedstock 102. Similarly, a screw, post, arm, or other physical element may be placed within the heated feedstock 102 and rotated or otherwise actuated to mix the heated feedstock 102. In an aspect, the feedstock 102 may include individual pellets, rods, or coils (e.g., of consistent size) and fed into a screw, a plunger, a rod extruder, or the like. For example, the feedstock 102 can be initially coiled and can be uncoiled with a heater system including a heated box, heated tube, or another type of heater.

The robotic system 108 may include a robotic system three-dimensionally positionable to move the one or more nozzles 110 within a working volume 115 defined by the build chamber 116. Thus, the robotic system 108 may, for example, include any robotic components or systems suitable for positioning the one or more nozzles 110 relative to the build plate 114 while extruding the feedstock 102 in a pattern to fabricate the object 112. A variety of robotics systems are known in the art and suitable for use as the robotic system 108 contemplated herein. For example, the robotic system 108 may include a Cartesian or x-y-z robotics system employing a number of linear controls to move independently in the x-axis, the y-axis, and the z-axis within the build chamber 116. Delta robots may also or instead be usefully employed, which can, in certain instances, provide significant advantages in terms of speed and stiffness, as well as offering the design convenience of fixed motors or drive elements. Other configurations such as double or triple delta robots can increase range of motion using multiple linkages. More generally, any robotics suitable for controlled positioning of the one or more nozzles 110 relative to the build plate 114, especially within a vacuum or similar environment, may be usefully employed including any mechanism or combination of mechanisms suitable for actuation, manipulation, locomotion and the like of the one or more nozzles 110, the build plate 114, or a combination thereof, within the build chamber 116.

The one or more nozzle 110 may dispense the feedstock 102 that has been propelled with the drive train 104 and, with the liquefaction system 106, heated to a suitable working temperature. In a multiphase extrusion, the working temperature may be above the melting temperature of a metallic component of the feedstock 102, or more specifically between a first temperature at which the metallic component melts and a second temperature (above the first temperature) at which a second phase of the feedstock 102 remains inert.

The one or more nozzles 110 may be used to dispense different types of material. For example, one of the one or more nozzles 110 may dispense the feedstock 102 while another one of the one or more nozzles 110 dispenses a support material to support bridges, overhangs, and other structural features of the object 112 that would otherwise violate design rules for fabrication with the feedstock 102. In another aspect, the one of the one or more nozzles 110 may deposit different types of materials, such as a thermally compatible polymer or a metal or polymer loaded with fibers of one or more materials, to increase tensile strength or otherwise improve mechanical properties of the resulting object 112. In an aspect, two types of supports may be used—(1) build supports and (2) sinter supports—e.g., using different materials printed into the same part to achieve these supports, or to create a distinguishing junction between these supports and the part. In another aspect, as described in greater detail below, two or more types of feedstocks may be extruded to form the object 112 with an advantageous spatial distribution to provide targeted structural support of the object 112 while facilitating rapid debinding of the polymers from the object 112 to form a dense, final part.

The one or more nozzles 110 may be formed of a material or combination of materials with mechanical and thermal properties suitable for withstanding temperatures and forces associated with extrusion of the feedstock 102. For example, the one or more nozzles 110 will preferably not degrade at the temperatures at which the feedstock 102 is t dispensed, or due to the passage of particles (e.g., metal, ceramic, or combinations thereof) through respective dispensing orifices defined by the one or more nozzles 110. While nozzles for traditional polymer-based fused filament fabrication may be made from brass or aluminum alloys, the one or more nozzles 110 suitable for dispensing the feedstock 102 including a powder material including metal, ceramic, or a combination thereof may be formed of harder materials, or materials compatible with more elevated working temperatures such as a high carbon steel that is hardened and tempered. Other materials such as a refractory metal (e.g. molybdenum, tungsten) or refractory ceramic (e.g. mullite, corundum, magnesia) may also or instead be useful to form the one or more nozzles 110. In some instances, aluminum nozzles may instead be used for MIM extrusion of certain MIM materials. In another aspect, a softer thermally conductive material with a hard, wear-resistant coating may be used, such as copper with a hard nickel plating.

In one aspect, the nozzle 110 may include one or more ultrasound transducers 130 as described herein. Ultrasound may be usefully applied for a variety of purposes in this context. In one aspect, ultrasound energy from the one or more ultrasound transducers 130 may facilitate extrusion by mitigating clogging (e.g., by reducing adhesion of a build material to an interior surface of the nozzle 110). A variety of energy director techniques may be used to improve this general approach. For example, a deposited layer may include one or more ridges, which may be imposed by an exit shape of the one or more nozzles 110, to present a focused area to receive ultrasound energy directed from the one or more ultrasound transducers 130 and introduced into an interface between the deposited layer and an adjacent layer.

In another aspect, the one or more nozzles 110 may include an induction heating element, resistive heating element, or similar components to control directly a temperature or temperatures of the one or more nozzles 110. This temperature control may augment a more general liquefaction process along the feed path through the printer 100, e.g., to maintain a temperature of the feedstock 102 during fabrication. Further, or instead, this temperature control may be used for more specific functions, such as declogging the one or more nozzles 110 by heating the feedstock 102 substantially above the working range, e.g., to a temperature where the feedstock 102 is liquid. While it may be difficult or impossible to control deposition of the feedstock 102 in this liquid state, the heating can provide a convenient technique to reset the one or more nozzles 110 without more severe physical intervention such as removing vacuum to disassemble, clean, and replace the affected components.

In another aspect, the one or more nozzles 110 may include an inlet gas or fan (e.g., an inert gas) to cool media at the moment the media exits the one or more nozzles 110. The resulting gas jet may, for example, immediately stiffen the material dispensed from the one or more nozzles 110 to facilitate extended bridging, larger overhangs, or other structures that might otherwise require support structures underneath.

The object 112 may be any object suitable for fabrication using the techniques contemplated herein. This may include functional objects such as machine parts, aesthetic objects such as sculptures, or any other type of objects, as well as combinations of objects that can be fit within the physical constraints of the build chamber 116 and the build plate 114. Some structures, such as large bridges and overhangs, cannot be fabricated directly using fused filament fabrication or the like because there is no underlying physical surface onto which a material can be deposited. In these instances, a support structure 113 may be fabricated, preferably of a soluble or otherwise readily removable material, to support the corresponding feature.

The one or more nozzles 110 may usefully provide any of a variety of additional build materials. This may, for example, include other composites, alloys, bulk metallic glasses, thermally matched polymers and so forth to support fabrication of suitable support structures. Bulk metallic glass particles, for example, may thus be loaded into a MIM feedstock binder system and may provide a support structure or object fabrication material. Pure binding or polymer materials (e.g., without any loading of a powder material) may also or instead provide a support. A similar metal MIM feedstock may be used for multi-material part creation. Ceramic or dissimilar metal MIM feedstock may be used for a support interface material.

In general, the feedstock 102 may include a binder and a powder of a material, such as a metal (or other material as described herein). A support material may also be provided from a second one of the one or more nozzles. The support material may consist of, for example, the binder of the feedstock 102, without the powder of the material that is thermally processable (e.g., sinterable) into the final object. In another aspect, the support material may be formed of a wax, or some other thermoplastic or other low molecular weight material that can be removed during processing of a printed green body. This support material may, for example, be used for vertical supports, as well as for top or side supports, or any other suitable support structures to provide a physical support during printing and subsequent thermal processing of the object 112. It will be understood that printing and thermal processing may impose different support requirements. As such, different support materials and or different support rules may be employed for each type of required support. Additionally, the print supports may be removed after a print and before thermal processing, while thermal processing supports are left attached to the green body until thermal processing (e.g., sintering) is completed (or sufficiently completed to eliminate or reduce the need for the thermal processing support structures).

In another aspect, the second nozzle (or a third nozzle) of the one or more nozzles 110 may be used to provide an interface material that is different from the support material, such as the corresponding binder, along with a ceramic or some other material that will not sinter under the time and temperature conditions used to sinter the powder of the material in the object 112. The interface material may also or instead include a metal or the like that forms a brittle interface with the object 112 that has been sintered. The brittle interface can break away from the object 112 that has been sintered to form a final object. Where this interface material does not sinter, it may be used in combination with a sinterable support structure that can continue to provide structural support to the object 112 during a sintering process.

The support material(s) may usefully integrate other functional substances. For example, titanium may be added to the support material as an oxygen getter to improve the sintering environment without introducing any titanium into the final object formed by sintering the object 112. Other types of additives may also or instead be used to remove contaminants. For example, a zirconium powder (or other strong carbide former) may be added to the support material to extract carbon contamination during sintering of the object 112.

In one aspect, the use of a non-structural support at the interface, e.g. a pure binder that does not sinter into the object 112, may be used to facilitate the additive manufacture of nested parts. That is, in certain instances, one or more non-structural supports may be removed such that the object 112 forms a plurality of parts. For example, the object 112 may be a complete gear box or the like fabricated within the build chamber 116, with the surfaces between gear teeth fabricated with a non-sintering binder or other material. In one aspect, critical mechanical interfaces for such mechanical parts may be oriented to the fabrication process, e.g., by orienting mating surfaces vertically so that smaller resolutions can be used. More generally, the capability to print adjacent, non-coupled parts may be used to fabricate multiple physically related parts in a single print job. This may, for example, include hinges, gears, captive bearings or other nested or interrelated parts. Non-sintering support material may be extracted, e.g., using an ultrasonicator, fluid cleaning, or other techniques after the object 112 is sintered to a final form. In an aspect, the binder is loaded with a non-sintering additive such as ceramic or dissimilar, higher sintering temperature metal.

This general approach to providing support structures may also affect the design of the object 112. For example, fluid paths may be provided in the object 112 for fluid cleaning, and removal paths may be created in the object 112 for interior support structures. This technique may also be used to address other printing challenges. For example, support structures within partially enclosed spaces may be fabricated for removal through some removal path after the object 112 is completed. If the support structures are weakly connected, or unconnected, to the object 112, the support structures can be physically manipulated for extraction through a removal path. In an aspect, the object 112 may include parts "glued" together with an appropriate (e.g., the same) MIM material to make a larger part that essentially has no joints once the object 112 is sintered.

The build plate 114 within the working volume 115 of the build chamber 116 may include a rigid and substantially planar surface formed of any substance suitable for receiving the extrusion of the feedstock 102 from the one or more nozzles 110. In one aspect, the build plate 114 may be heated, e.g., resistively or inductively, to control a temperature of the build chamber 116 or the surface upon which the object 112 is being fabricated. Heating the build plate 114 may, for example, improve adhesion, prevent or reduce the likelihood of thermally induced deformation or failure, and/or facilitate relaxation of stresses within the object 112 being fabricated. In another aspect, the build plate 114 may be deformable to bend or otherwise physically deform to facilitate detachment of the build plate 114 from the object 112 formed thereon.

The build chamber 116 may be any chamber suitable for containing the build plate 114, the object 112, and any other component or components of the printer 100 usefully positioned within the build chamber 116 to fabricate the object 112. In one aspect, the build chamber 116 may be an environmentally sealed chamber that can be evacuated with a vacuum pump 124 or similar device to provide a vacuum environment in the working volume 115 for fabrication of the object 112. This vacuum may be particularly useful where oxygen results in formation of a passivation layer that may weaken layer-to-layer bonds in fused filament fabrication processes, such as those contemplated herein, or where particles in the atmosphere might otherwise interfere with the integrity of the object 112, or where the build chamber 116 is the same as the sintering chamber. In another aspect, only oxygen is removed from the build chamber 116.

Similarly, one or more passive or active oxygen getters 126 or other similar oxygen absorbing material or system may usefully be employed within the build chamber 116 to take up free oxygen within the build chamber 116. The oxygen getter 126 may, for example, include a deposit of a reactive material coating an inside surface of the build chamber 116 or a separate object placed within the build chamber 116 that completes and maintains the vacuum by combining with or adsorbing residual gas molecules. The oxygen getter 126, or more generally, gas getter, may be deposited as a support material using one of the one or more nozzles 110, which facilitates replacement of the gas getter with each new fabrication run and can advantageously position the gas getter(s) near printed media to improve local removal of passivating gasses where new material is being deposited onto the object 112. In one aspect, the oxygen getters 126 may include any of a variety of materials that preferentially react with oxygen including, for example, materials based on titanium, aluminum, and so forth. In another aspect, the oxygen getters 126 may include a chemical energy source such as a combustible gas, gas torch, catalytic heater, Bunsen burner, or other chemical and/or combustion source reactable to extract oxygen from the environment. There are a variety of low-CO and NOx catalytic burners that may be suitably employed for this purpose.

In one aspect, the oxygen getter 126 may be deposited as a separate material during a build process. Thus, in one aspect, fabricating the object 112 from the feedstock 102 may include co-fabricating a physically adjacent structure (which may or may not directly contact the object 112) containing an agent to remove passivating gasses around the object 112. Other techniques may be similarly employed to control reactivity of the environment within the build chamber 116, or within one or more post-processing chambers or the like as described below. For example, the build chamber 116 may be filled with an inert gas or the like to prevent or reduce the likelihood of oxidation of material forming the object 112 and/or other material present in the build chamber 116.

The control system 118 may include a processor and memory, as well as any other co-processors, signal processors, inputs and outputs, digital-to-analog or analog-to-digital converters and other processing circuitry useful for monitoring and controlling a fabrication process (such as, for example, any one or more of the additive manufacturing processes described herein) executing on the printer 100.

The control system 118 may be coupled in a communicating relationship with a supply of the feedstock 102, the drive train 104, the liquefaction system 106, the one or more nozzles 110, the build plate 114, the robotic system 108, and any other instrumentation or control components associated with the build process, such as temperature sensors, pressure sensors, oxygen sensors, vacuum pumps, and so forth. The control system 118 may be operable to control the robotic system 108, the liquefaction system 106 and other components to fabricate the object 112 from the feedstock 102 by extruding the feedstock 102 through tone one or more nozzles 110 in three dimensions within the working volume 115 of the build chamber 116.

The control system 118 may generate machine ready code for execution by the printer 100 to fabricate the object 112 from a three-dimensional model 122. The control system 118 may deploy a number of strategies to improve the resulting physical object structurally or aesthetically. For example, the control system 118 may use plowing, ironing, planing, or similar techniques where the one or more nozzles 110 run over existing layers of deposited material, e.g., to level the material, remove passivation layers, apply an energy director topography of peaks or ridges to improve layer-to-layer bonding, or otherwise prepare the current layer for a next layer of material. The one or more nozzles 110 may include a low-friction or non-stick surface such as Teflon, TiN or the like to facilitate this plowing process. Further, or instead, the one or more nozzles 110 may be heated and/or vibrated (e.g., using an ultrasound transducer) to improve the smoothing effect. In one aspect, surface preparation may be incorporated into the initially-generated machine ready code. In another aspect, the printer 100 may dynamically monitor deposited layers and determine, on a layer-by-layer basis, whether additional surface preparation is necessary or helpful for successful completion of the object 112.

In one aspect, pressure or flow rate may be a process feedback signal to the control system 118. While temperature is frequently a critical physical quantity for fabrication with certain materials, it may be difficult to accurately measure the temperature of a composite build material, such as the feedstock 102, throughout a feed path. However, the temperature can be inferred by the viscosity of the feedstock 102, which can be estimated for the bulk material based on how much force is being applied to drive the feedstock 102 through a feed path. Thus, in one aspect, the printer 100 may measure the force applied by the drive train 104 to the feedstock 102, infer a temperature of the feedstock 102 based on the instantaneous force, and control the liquefaction system 106 to adjust the temperature accordingly.

In general, the three-dimensional model 122 of the object 112 may be stored in a database 120, such as a local memory of a computer used as the control system 118, or a remote database accessible through a server or other remote resource, or in any other computer-readable medium accessible to the control system 118. The control system 118 may retrieve the three-dimensional model 122 (e.g., a particular model) in response to user input, and generate machine-ready instructions for execution by the printer 100 to fabricate the object 112 corresponding to the three-dimensional model 122. Generating machine-ready instructions may include the creation of intermediate models, such as where a CAD model is converted into an STL model or other polygonal mesh or other intermediate representation, which can, in turn, be processed to generate machine instructions for fabrication of the object 112 by the printer 100.

In another aspect, the one or more nozzles 110 may include one or more mechanisms to flatten a layer of deposited material and apply pressure to bond the layer to an underlying layer. For example, a heated nip roller, caster, or the like may follow the one or more nozzles 110 as the one or more nozzles 110 move along respective one or more paths through an x-y plane of the build chamber 116 to flatten the deposited (and still pliable) layer of extruded material. The one or more nozzles 110 may also or instead integrate a forming wall, planar surface or the like to additionally shape or constrain the feedstock 102 as it extruded through the one or more nozzles 110. The one or more nozzles 110 may usefully be coated with a non-stick material (which may vary according to the build material being used) to facilitate more consistent shaping and smoothing by the one or more nozzles 110 in instances in which the one or more nozzles 110 are used for these purposes.

In another aspect, the printer 100 may include a layer fusion system 132 useful for encouraging good mechanical bonding between adjacent layers of the feedstock 102 deposited within or along the object 112. The layer fusion system 132 may include the ultrasound transducers described above, which may be used to facilitate bonding between layers by applying ultrasound energy to an interface between layers during deposition. In another aspect, the layer fusion system 132 may pass current through an interface between adjacent layers to Joule heat the interface and liquefy or soften the materials of the adjacent layers for improved bonding between the adjacent layers. Thus, in one aspect, the layer fusion system 132 may include a joule heating system positionable to apply a current between a first layer of the feedstock 102 extrusion and a second layer of the feedstock 102 extrusion in the working volume 115 while the first layer is being deposited on the second layer. In another aspect, the layer fusion system 132 may include an ultrasound system for applying ultrasound energy to a first layer of the feedstock 102 extrusion while the first layer is being deposited onto a second layer of the feedstock 102 extrusion in the working volume 115. In another aspect, the layer fusion system 132 may include a rake, ridge(s), notch(es) or the like formed into the end of the one or more nozzles 110, or a fixture or the like adjacent to the one or more nozzles, to form energy directors on a top surface of the extruded feedstock 102. Other techniques may also or instead be used to improve layer-to-layer bonding, such as plasma cleaning or other depassivation before or during formation of the interlayer bond.

During fabrication, detailed data may be gathered for subsequent use and analysis. For example, the printer 100 may include a camera and computer vision system that identifies errors, variations, or the like that occur in each layer of the object 112. Similarly, tomography or other imaging techniques may be used to detect and measure layer-to-layer interfaces, aggregate part dimensions, diagnostic information (defects, voids, and the like) and so forth. These data may be gathered and delivered with the object 112 to an end user as a digital twin 140 of the object 112 so that the end user can evaluate whether and how variations and defects might affect use of the object 112. In addition to spatial/geometric analysis, the digital twin 140 may log process parameters including, e.g., aggregate statistics such as weight of material used, time of print, variance of build chamber temperature, and so forth, as well as chronological logs of any process parameters of interest such as volumetric deposition rate, material temperature, environment temperature, and so forth.

The printer 100 may include a camera 150 or other optical device. In one aspect, the camera 150 may be used to create the digital twin 140 described above, or to more generally facilitate machine vision functions or facilitate remote monitoring of a fabrication process. Video or still images from the camera 150 may also or instead be used to dynamically correct a print process, or to visualize where and how automated or manual adjustments should be made, e.g., where an actual printer output is deviating from an expected output.

The printer 100 may include a subtractive fabrication tool 160 such as a drill, milling bit, or other multi-axis controllable tool for removing material from the object 112. For example, the subtractive fabrication tool 160 may remove from the object 112 material that deviates from an expected physical output based on the three-dimensional model 122 used to fabricate the object 112. The use of MIM materials such as the feedstock 102 provides an advantage when subtractive shaping is performed on the object 112 as a green body (e.g., after net shape forming but before thermal processing (or debinding)), when the object 112 is relatively soft and workable. More specifically, the use of MIM materials to form the object 112 permits quick and easy removal of physically observable defects and printing artifacts before the object 112 is sintered or otherwise thermally processed into a dense, final object. Further, or instead, the subtractive fabrication tool 160 may be operable to tap threads or otherwise add features to the object 112. Similarly, an aspect may include combining multiple single green parts into one larger fully solid sintered part.

Other useful features may be integrated into the printer 100 described above. For example, a solvent or other material may be usefully applied a surface of the object 112 during fabrication to modify properties of the object 112. The solvent may, for example, intentionally oxidize or otherwise modify a surface of the object 112 at a particular location or over a particular area to provide a desired electrical, thermal, optical, or mechanical property. This capability may be used to provide aesthetic features such as text or graphics, or to provide functional features such as a window for admitting RF signals.

In general, a fabrication process such as FFF implies, or expressly includes, a set of design rules to accommodate physical limitations of a fabrication device and a build material. For example, a horizontal shelf cannot generally be fabricated without positioning a support structure underneath. While the design rules for FFF apply to fabrication of a green body using FFF techniques as described herein, the green body may also be subject to various MIM design rules. This may, for example, include a structure to prevent or minimize drag on a floor while a part shrinks during sintering which may be 20% or more depending on the composition of the green body. Similarly, certain supports are required during sintering, and these supports may be different than the supports required during FFF. As another example, injection molding typically aims for uniform wall thickness to reduce variability in debinding and/or sintering behaviors, with thinner walls being preferred. The printer 100 may apply disparate sets of design rules—those for the rapid prototyping system (e.g., FFF) and those for the sintering process (e.g., MIM design rules)—to a CAD model that is being prepared for fabrication of the object 112.

The FFF design rules and the MIM design rules may also be combined under certain conditions. For example, the support structures for a horizontal shelf during fabrication must resist the force of an extrusion/deposition process used to fabricate the horizontal shelf, whereas the support structure during sintering only needs to resist the forces of gravity during the baking process. Thus, the CAD model for fabrication of the object 112 may include two separate supports that are removable at different times during a fabrication process: fabrication supports that are configured to resist the force of a fabrication process and may be breakaway supports that are loosely mechanically coupled to a green body, along with sintering supports that may be less extensive, and only need to resist the gravitational forces on a body during sintering. These latter supports may be preferably coupled to the object 112 through a non-sinterable layer to facilitate easy removal from the dense, final object. In another aspect, the fabrication supports may be fabricated from binder without a powder or other fill so that the fabrication supports may completely disappear during a sintering process.

Figure 2:
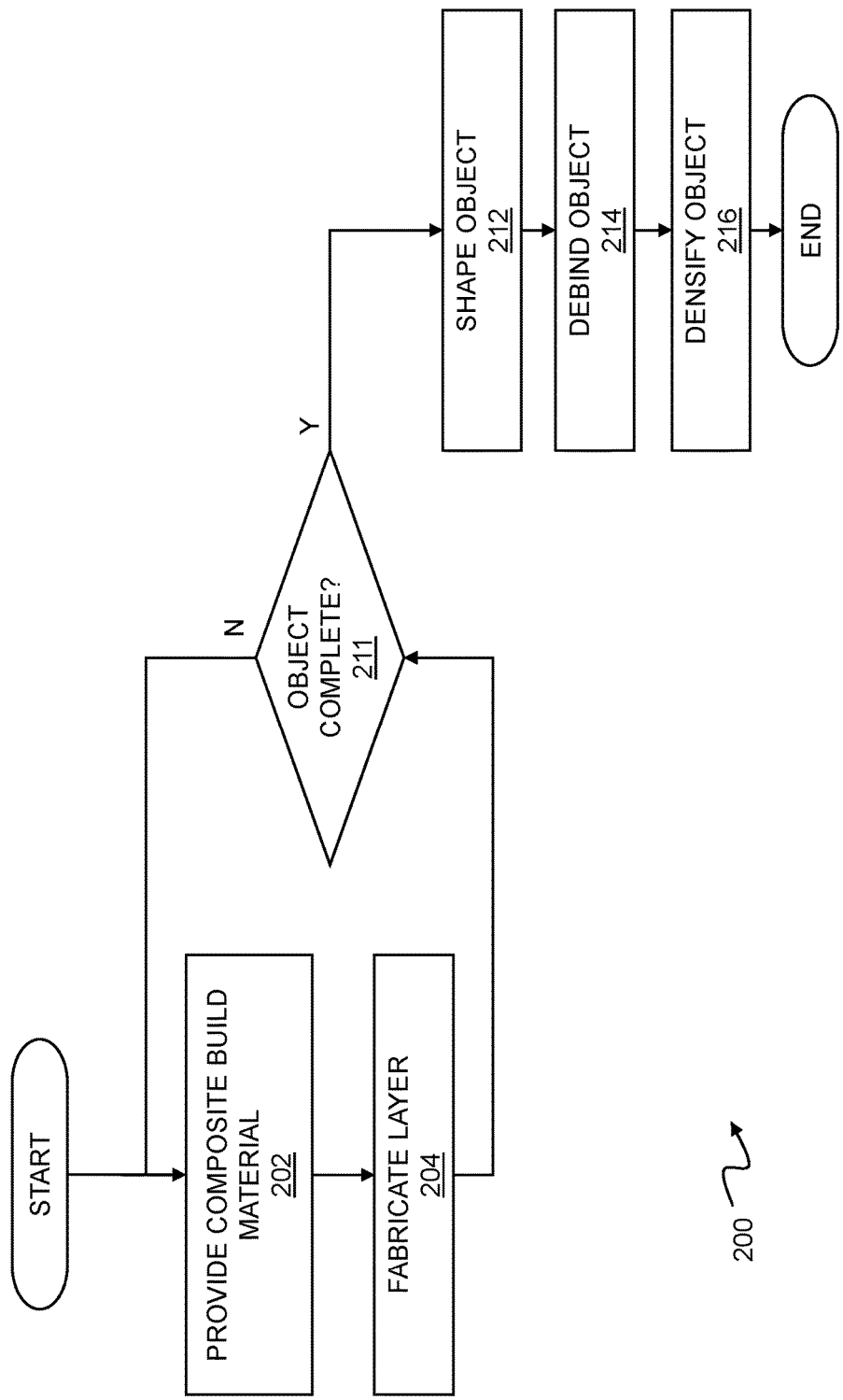
FIG. 2 is a flow chart of an exemplary method for printing with composites.

FIG. 2 is a flow chart of an exemplary method 200 for printing a three-dimensional object with composites, e.g., metal injection molding materials.

As shown in step 202, the exemplary method 200 may include providing a build material including an injection molding material, or where a support interface is being fabricated, a MIM binder (e.g., a MIM binder with similar thermal characteristics). The material may, for example, be any of the MIM materials contemplated herein. The material may be provided as a feedstock in a billet, a wire, or any other cast, drawn, extruded or otherwise shaped bulk form. As described above, the feedstock may be further packaged in a cartridge, spool, or other suitable carrier that can be attached to an additive manufacturing system for use.

As shown in step 204, the exemplary method 200 may include fabricating a layer of an object in a working volume of a build chamber. This may include any techniques that can be adapted for use with MIM materials. For example, this may include fused filament fabrication, jet printing, selective laser sintering, or any other techniques for forming a net shape from a MIM material (and more specifically for techniques used for forming a net shape from a polymeric material loaded with a powder of a material in a second phase).

As shown in step 211, exemplary method 200 may be continued and repeated as necessary to fabricate an object within the working volume. While the process may vary according to the underlying fabrication technology, an object can generally be fabricated layer by layer based on a three-dimensional model of the object being fabricated.

As shown in step 212, the exemplary method 200 may include shaping the net shape object after the additive process is complete. Before debinding or sintering, the green body form of the object is usefully in a soft, workable state where defects and printing artifacts can be removed, either manually or automatically, rather easily as compared to removal from a harder form of the object. Thus, the exemplary method 200 may take advantage of this workable, intermediate state to facilitate quality control or other process-related steps, such as removal of supports that are required for previous printing steps, but not required for debinding or sintering.

As shown in step 214, the exemplary method 200 may include debinding the printed object. In general, debinding may be performed chemically or thermally to remove a binder that retains a powder of a material (e.g., a metal, a metal alloy, and/or a ceramic) in a net shape. Contemporary injection molding materials are often engineered for thermal debinding, which advantageously permits debinding and sintering to be performed in a single thermal operation, or in two similar thermal operations. In general, the debinding process may remove binder from the net shape green object, leaving a dense structure of the material of the powder that can be densified (e.g., through sintering, infiltration with a liquid metal, or other thermal processing) into the final form.

As shown in step 216, the exemplary method 200 may include densifying the printed and debound object into a final form. For the sake of efficient and clear description, the printed and debound object may occasionally be referred to herein as a brown part. In general, densifying the brown part may include applying to the brown part any process of compacting and forming a solid mass of material without liquefaction. Thus, densification of the brown part may include any one or more thermal processes, such as sintering, infiltration of the object with a liquid metal, and combinations thereof. For example, during a sintering process, atoms can diffuse across particle boundaries to fuse into a solid piece. Because sintering can be performed at temperatures below the melting temperature of the metal, sintering can advantageously facilitate fabrication with high melting point materials, examples of which include tungsten and molybdenum.

Numerous sintering techniques are known in the art, and the selection of a particular sintering technique may depend upon the composition of the brown part, and the desired structural, functional or aesthetic result for the final object. For example, in solid-state (non-activated) sintering, metal powder particles are heated to form connections (or "necks") where they are in contact. Over time, these necks thicken and create a dense part, leaving small, interstitial voids that can be closed, e.g., by hot isostatic pressing (HIP) or similar processes. Other techniques may also or instead be employed. For example, solid state activated sintering uses a film between powder particles to improve mobility of atoms between particles and accelerate the formation and thickening of necks. As another example, liquid phase sintering may be used, in which a liquid forms around metal particles. This can improve diffusion and joining between particles, but also may leave a lower-melting phase within the sintered object that may impair structural integrity. Other advanced techniques such as nano-phase separation sintering may be used, for example to form a high-diffusivity solid at the necks to improve the transport of metal atoms at the contact point, as described for example in "Accelerated sintering in phase-separating nanostructured alloys," Park et al., Nature Communications, 6:6858 (DOI: 10.1038/ncomms7858) (Apr. 22, 2015), incorporated herein by reference in its entirety.

It will be understood that debinding and thermal processing may result in material loss and compaction, and the resulting object may be significantly smaller than the printed object. However, these effects are generally linear in the aggregate, and net shape objects can be usefully scaled up when printing to create a target shape after debinding and sintering.

Figure 3:
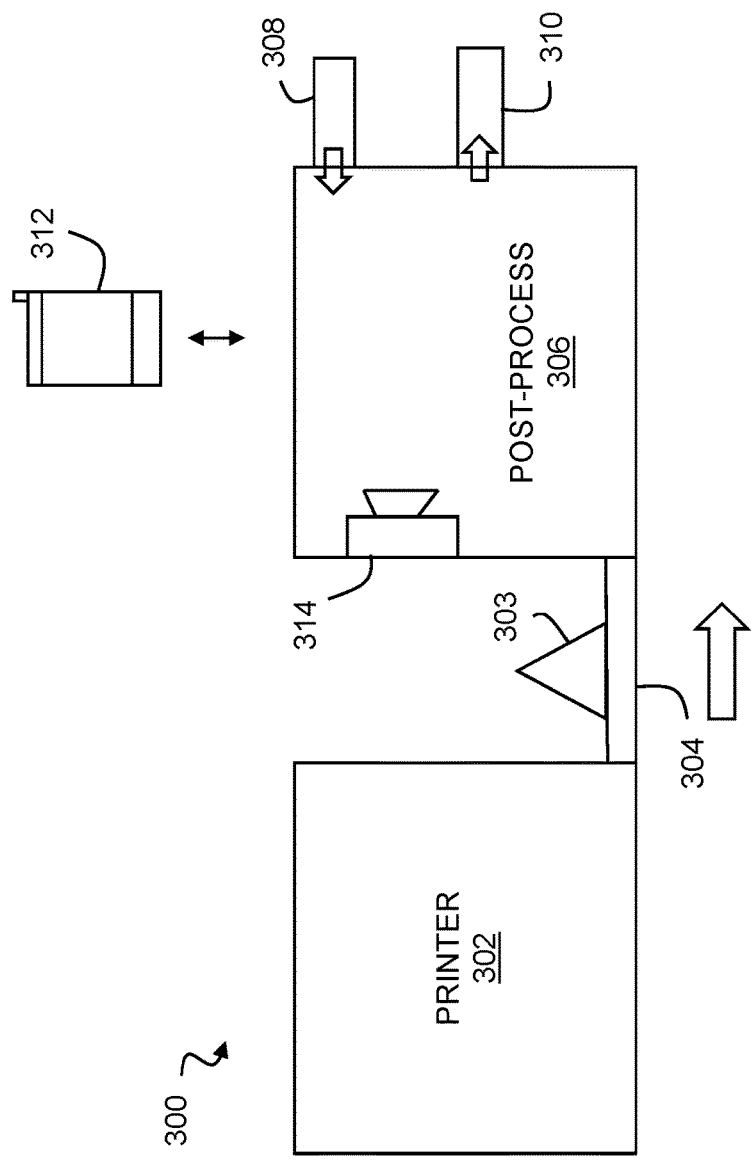
FIG. 3 is a schematic representation of an additive manufacturing system for use with metal injection molding materials.

FIG. 3 is a schematic representation of an additive manufacturing system 300 for use with metal injection molding materials, such as any one or more of the metal injection molding materials described herein, unless otherwise indicated or made clear from the context. The additive manufacturing system 300 may include a printer 302, a conveyor 304, and a post-processing station 306.

In general, the printer 302 may be any of the printers described herein including, for example, the printer 100 (FIG. 1). More generally, the printer 302 may be a fused filament fabrication system, a stereolithography system, a selective laser sintering system, or any other system that can be usefully adapted to form, under computer control, a net shape object using injection molding materials. The output of the printer 302 may be an object 303 which, unless otherwise indicated or made clear from the context, shall be understood to be similar to the object 112 (FIG. 1). Thus, for example, the object 303 may be a green body including any suitable powder of a material (e.g., metal, metal alloy, ceramic, and so forth, as well as combinations of the foregoing), along with one or more binders that retain the powder in a net shape produced by the printer 302.

The conveyor 304 may transport the object 303 from the printer 302 to a post-processing station 306, where debinding and thermal processing (e.g., sintering) can be performed. The conveyor 304 may be any suitable device or combination of devices suitable for physically transporting the object 303. This may, for example, include robotics and a machine vision system or the like on the printer side for detaching the object 303 from a build platform or the like, as well as robotics and a machine vision system or the like on the post-processing side to accurately place the object 303 within the post-processing station 306. In another aspect, the post-processing station 306 may serve multiple printers so that a number of objects can be debound and thermally processed concurrently, and the conveyor 304 may interconnect the printers and post-processing station so that multiple print jobs can be coordinated and automatically completed in parallel. In another aspect, the object 303 may be manually transported between the two corresponding stations.

The post-processing station 306 may be any system or combination of systems useful for converting a green part—formed into a desired net shape from a metal injection molding build material by the printer 302—into a final object. The post-processing station 306 may, for example, include a chemical debinding station and a thermal sintering station that can be used in sequence to produce a final object. Some contemporary injection molding materials are engineered for thermal debinding, which makes it possible to perform a combination of debinding and sintering steps with a single oven or similar device. While the thermal specifications of a sintering furnace will depend upon the powder to be sintered, the binder system, the loading, and other aspects of the green object and the materials used to manufacture same, commercial sintering furnaces for thermally debinding and sintering MIM parts typically operate with an accuracy of +/−5 degrees Celsius or better, and at temperatures of at least 600 degrees C., or from about 200 degrees C. to about 1900 degrees C. for extended times. Any such furnace or similar heating device may be usefully employed as part of the post-processing station 306 as contemplated herein. Vacuum or pressure treatment may also or instead be used. In an aspect, identical or similar material beads with a non-binding coating may be used for a furnace support—e.g., packing in a bed of this material that shrinks similar to the part, except that it will not bond to the part.

It will also be appreciated that a wide range of other debinding and thermal processes can be used. For example, all or a portion of a binder system may be removed in a chemical debind, a thermal debind, or some combination of these. Other debinding processes are also known in the art (such as supercritical or catalytic debinding), any of which may also or instead be employed by the post-processing station 306 to thermally process the object 303 as contemplated herein. For example, in a common process, a green part is first debound using a chemical debind, which is followed by a thermal debind at a moderately high temperature (in this context, around 700-800 C) to remove organic binder and create enough necks among a powdered material to form a brown part that may be handled. From this stage, the object may be moved to a sintering furnace to remove any remaining components of a binder system and densify the object. In another aspect, a pure thermal debind may be used to remove the organic binder. More general, any technique or combination of techniques may be usefully employed to debind an object as contemplated herein.

Similarly, a wide range of sintering techniques may be usefully employed by the post-processing station 306. In one aspect, the object 303 may be consolidated in a furnace to a high theoretical density using vacuum sintering. In another aspect, the furnace may use a combination of flowing gas (e.g., at below atmospheric pressure, slightly above atmospheric pressure, or some other suitable pressure) and vacuum sintering. More generally, any sintering or other process suitable for improving object density may be used, preferably such that the process yields a near-theoretical density part with little or no porosity. Hot-isostatic pressing ("HIP") may also (e.g., as a post-thermal processing finishing step) or instead be employed, e.g., by applying elevated temperatures and pressures of 10-50 ksi, or between about 15 and 30 ksi. In another aspect, the object 303 may be processed using any of the foregoing, followed by a moderate overpressure (greater than the sintering pressure, but lower than HIP pressures). In this latter process, gas may be pressurized at 100-1500 psi and maintained at elevated temperatures within the furnace or some other supplemental chamber. In another aspect, the object may be separately heated in one furnace, and then immersed in a hot granular media inside a die, with pressure applied to the media so that the pressure can be transmitted to the object 303 to drive more rapid consolidation to near full density. More generally, any technique or combination of techniques suitable for removing binder systems and driving a powdered material toward consolidation and densification may be used by the post-processing station 306 to process a fabricated green part as contemplated herein.

In one aspect, the post-processing station 306 may be incorporated into the printer 302, thus removing a need to physically transport the object 303, such as via the conveyor 304. The build volume of the printer 302 and components therein may be fabricated to withstand the elevated temperatures during debind and/or thermal processing. In another aspect, the printer 302 may provide movable walls, barriers, or other enclosure(s) within the build volume so that the debind and/or sinter can be performed while the object 303 is on a build platform within the printer 302, but thermally isolated from thermally sensitive components or materials.

The post-processing station 306 may be optimized in a variety of ways for use in an office or similar interior environment. In one aspect, the post-processing station 306 may include an inert gas source 308. The inert gas source 308 may, for example, include argon or other inert gas (or other gas that is inert with respect to the sintered material), and may be housed in a removable and replaceable cartridge that can be coupled to the post-processing station 306 for discharge into the interior of the post-processing station 306, and removed and replaced (e.g., when the contents are exhausted). The post-processing station 306 may also or instead include a filter 310 such as a charcoal filter or the like for exhausting gasses that can be outgassed into an office environment in an unfiltered form. For other gasses, an exterior exhaust, or a gas container or the like may be provided to permit use in unventilated areas. For reclaimable materials, a closed system may also or instead be used, particularly where the environmental materials are expensive or dangerous.

In one aspect, the post-processing station 306 may be coupled to other system components. For example, the post-processing station 306 may include information from the printer 302, or from a controller for the printer, about the geometry, size, mass and other physical characteristics of the object 303 to generate a suitable debinding and thermal processing profile. In another aspect, the profile may be independently created by the controller or other resource and transmitted to the post-processing station 306 when the object 303 is conveyed. In another aspect, the post-processing station 306 may monitor the debinding and thermal process and provide feedback, e.g., to a remote device 312 (e.g., a smart phone), about a status of the object, a time to completion, and other processing metrics and information. The post-processing station 306 may include a camera 314 or other monitoring device to provide feedback to the remote device 312, and may provide time lapse animation or the like to graphically show sintering or other thermal processing on a compressed time scale. Post-processing may also or instead include finishing with heat, a hot knife, tools, or similar techniques. Post-processing may, further or instead, include applying a finish coat.

In one aspect, the post-processing station 306 may employ microwave sintering to accelerate post processing. Powdered metals in particular are good absorbers of microwave energy and can be efficiently heated using microwave techniques. Ceramics can also be sintered in this manner, where microwave heating is linked to the dielectric loss of the material and other factors. A suitable microwave sintering process is described for example in Agrawal, "Microwave sintering of ceramics, composites, metals, and transparent materials," Journal of Materials Education, Vol. 19, pp. 49-47, incorporated herein by reference in its entirety, where microwave sintering times were reduced, e.g., from 12-24 hours down to 90 minutes, with comparable density, hardness, and bending strength of the sintered material. Any other configuration suitable for microwave heating in an amount and for a duration suitable for sintering of MIM materials may also or instead be employed.

Where the binder system of the feedstock is also engineered for thermal debinding, the method may include debinding the green object by applying microwave energy, e.g., using the post-processing station 306 described above.

Figure 4:
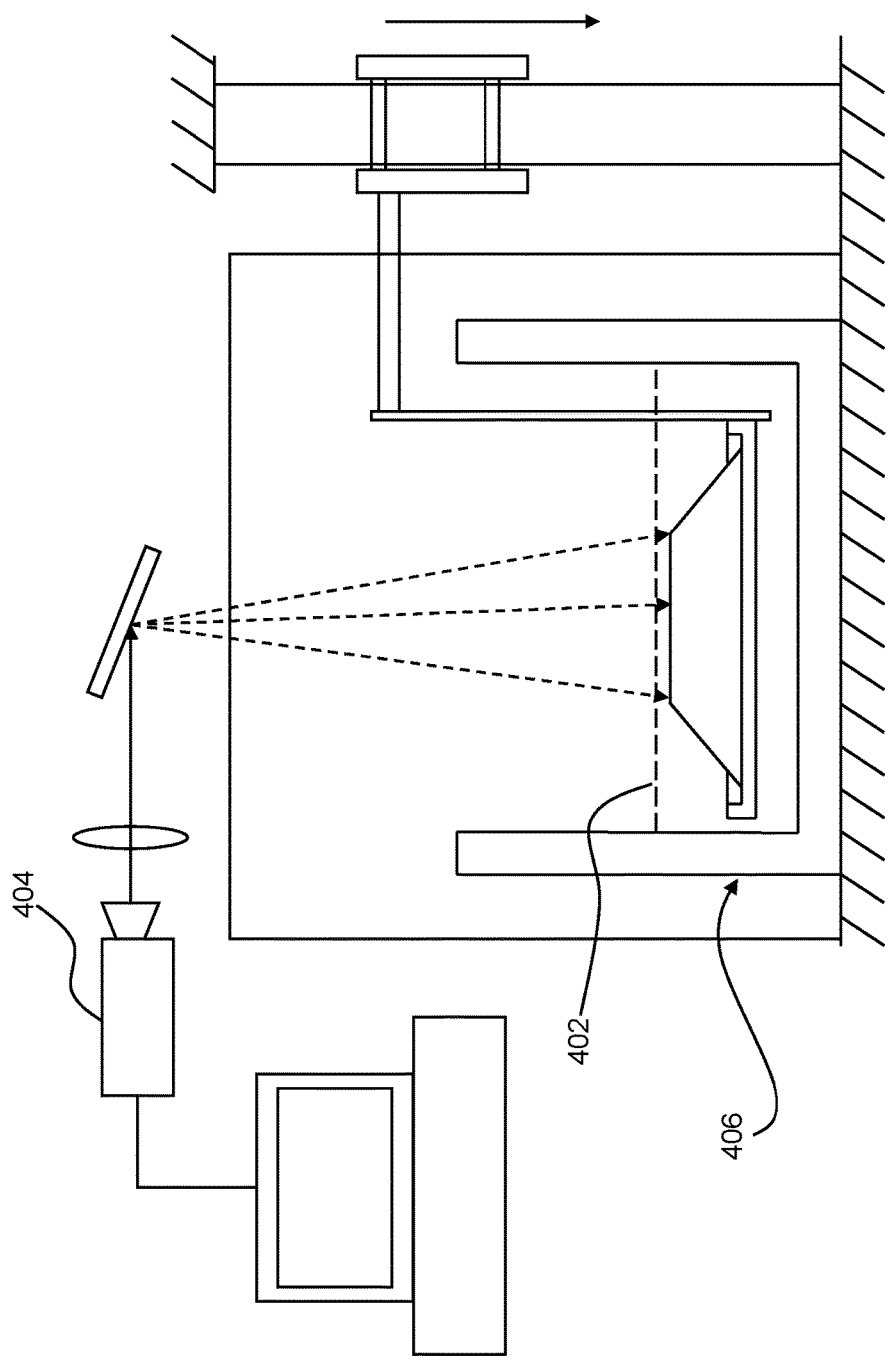
FIG. 4 is a schematic representation of a stereolithography process using a metallic powder and an ultraviolet-curable binder.

FIG. 4 is a schematic representation of a stereolithography process using a powder of material and -a curable binder. In general, a build material 402 may be formed using an injection molding powder, such as any of those described herein, dispersed in a curable binder. The curable binder may be any suitable photopolymer resin curable using a light source compatible with curing the binder. For example, a laser 404 may be used to provide light at a specific wavelength suitable for curing the binder. More specifically, in instances in which the build material 402 includes a UV-curable binder, the laser 404 may provide UV light such that exposure of the build material 402 to light from the laser 404 may cure the UV-curable binder. The build material 402 may be cured on a layer-by-layer basis with the laser 404 using known stereolithography techniques to form a cured green body having a shape of the desired object. It will be appreciated that MIM powders will generally be opaque, and adaptations to a light source of the laser 404 may be used to improve the structural integrity of the fabricated green object, such as forming a layer size equal to or less than an average diameter of powder particles suspended in the build material 402, or providing laser light from multiple sources/directions to reduce or minimize occlusion of the resin at each layer. In another aspect, there is disclosed herein a sinterable, net shape green body object formed according to a computer model and including a base material in powder form and a curable (or cured) resin that can be debound and/or thermally processed into a final object, as well as a process for sintering an object comprising a base material in powder form and a cured resin. It shall be understood that the powder may be suspended within a curable binder, creating a slurry or suspension. The mass and surface area of the particles versus the specific rheology of the binder may dictate whether or not the powder will float indefinitely or settle due to gravity. Using nano sized particles may optimize the ability of the powder to form a stable suspension that does not settle (over reasonable timescales).

To reduce binder char and subsequent carbon contamination and increase shape retention, the binder may include two parts—a curable resin (e.g., a UV curable resin) and a second component that may be removed (e.g., debound) prior to moving the object into a furnace. Similar multicomponent binder formulations have been shown to reduce carbon pickup from the burnout process and reduce part failures by buildup of gases inside the part. Many possible binder combinations exist, including poly(ethylene glycol) (PEG) as a solvent-soluble primary binder component that may be removed prior to insertion of the object into the furnace, along with a secondary binder based on poly (ethylene glycol) diacrylate (PEG-DA), or any number of other curable resins.

The curable resin may be a UV curable resin, such as a commercially available investment casting resin engineered for stereolithography fabrication, or any other suitable curable resin or the like. The UV curable resin may usefully incorporate an increased concentration of an activating die (at least 50% greater than typical commercially available UV curable resins) to compensate for optical interference of opaque particles.

In another aspect, the stereolithography process may be modified to address particle opacity in other ways. For example, a current layer may be coated with a polymer (e.g., by moving the object along the z-axis within a bath 406, either up or down according to the species of stereolithography being employed), and then a powder may be introduced, after which the layer may be cured in a desired cross section using exposure to light of an appropriate wavelength. In another aspect, the layer may be cured, powdered, and then coated with another layer of powder, so that the resin is fully exposed to the light stimulus before coating with an additional powder layer.

In another aspect, the mixture of a MIM powder and a curable resin may be dispensed and cured (e.g., photocured) on a layer-by-layer basis to remove or reduce the need for the bath 406.

Further, or instead, any technique for local thermal activation of a binder may be used in combination with a powder bed of MIM material (and binder) as contemplated herein to form a green body. For example, targeted thermal activation may be achieved with a thermal print head, an IR heating mask and/or lamp, focused microwave energy, selective thermal sintering, steering of an activation beam with a digital light processing chip, a heated roller, or any other technique or combination of techniques. For example, a variety of thermal print heads are commercially available, e.g., from KYOCERA® and other manufacturers that may be suitably adapted to applying targeted thermal energy to a layer of binder and MIM powder.

Figure 5:
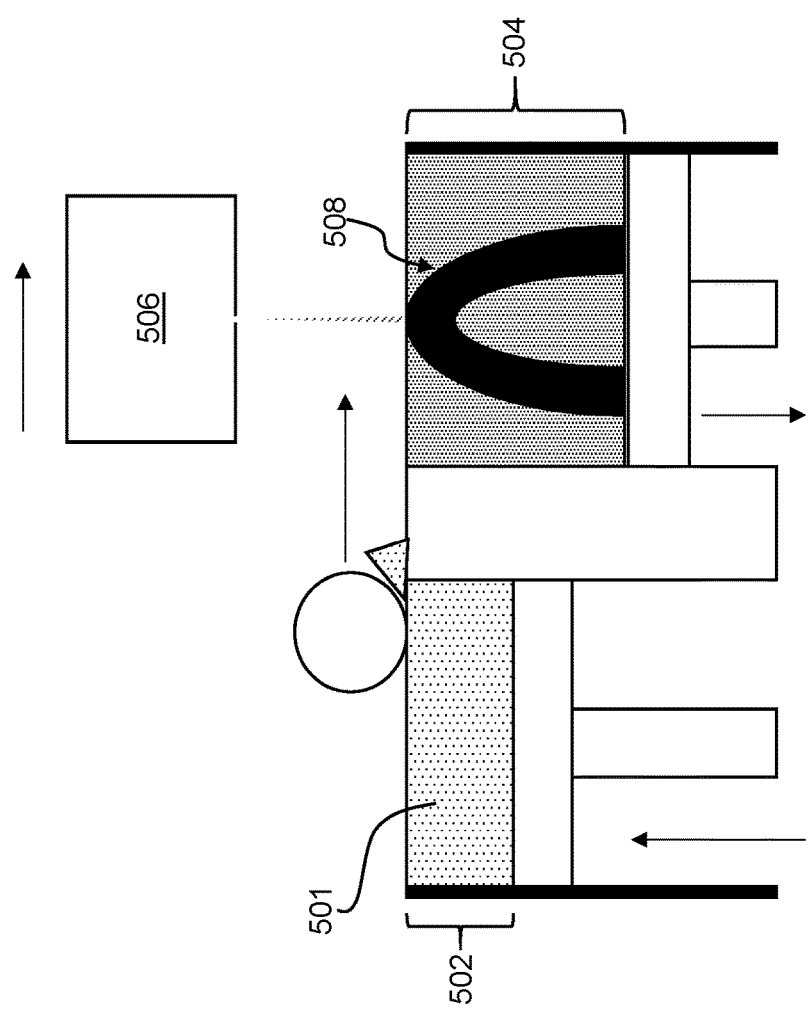
FIG. 5 is a schematic representation of a laser binding process for using powder metallurgy materials.

FIG. 5 is a schematic representation of a laser binding process for powder metallurgy materials. In a process similar to selective laser sintering, a powder/binder mixture 501 may be fed from a powder delivery system 502 to a fabrication bed 504. The binder in the powder/binder mixture 501 may be activated on a layer-by-layer basis using an activation source 506 (e.g., a laser) to create a low strength bond in the binder in the powder/binder mixture for each cross section of a target shape. This activation may form a sufficient bond to retain the powder/binder mixture in a net shape green body 508 that can be removed and thermally processed using one or more of thermal processes described herein. Suitable binders are available that can be activated using relatively inexpensive, low-power, fast laser processes or masked IR or UV. Such binders significantly improve upon existing direct metal laser sintering processes that otherwise require special atmospheric controls and high-power lasers.

Higher energy lasers may be usefully employed, for example, to more fully melt and/or remove binder material and improve the density of the green body before sintering, or to initiate sintering of the metal within the green body. In another aspect, the MIM materials contemplated herein may be adapted for use in a selective laser melting process where the binder melts to form a net-shape green body which is then debound and sintered according to the methods described herein.

Figure 6:
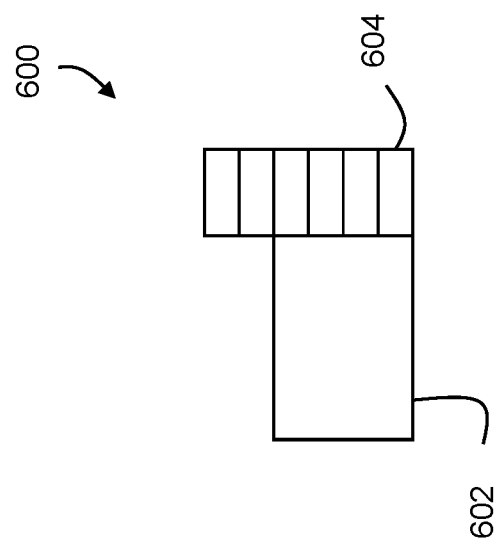
FIG. 6 is a schematic representation of the use of finishing materials in a fabricated object.

FIG. 6 is a schematic representation of the use of finishing materials in a fabricated object. In general, the particle size of the powder used in a FFF build material or the like may affect the available print resolution and surface finish of the object 600. To address this issue, a low-resolution material 602 may be used to fabricate internal structures of the object 600, and a high-resolution material 604 may be used to fabricate surface structures.

The low-resolution material 602 may contain larger particle sizes (e.g., about 10-20 microns) suitable for the generally larger feature size and print resolution used to fabricate the interior of the object. The high-resolution material 604 may include smaller particle sizes (e.g., less than 10 microns, or less than one micron). The high-resolution material 604 may take longer to print, and may be more expensive, particularly where very small and more difficult to fabricate particles are incorporated into the build material. Thus, it may be beneficial, both in terms of fabrication time and fabrication cost, to limit the use of high resolution materials to the exterior surfaces. To prevent collisions of a print tool with the printed object 600, it may also be useful to print exterior surface first up to a layer height of the low-resolution material 602, after which a road of the low-resolution material may be added. The materials may, e.g., be deposited from different nozzles, or from a variable sized nozzle, preferably with appropriate purging operations between materials.

Thus, there is disclosed herein a printer that uses a low-resolution feedstock for interior structures and a high-resolution feedstock for exterior structures. While a side structure is shown for the sake of clarity of illustration, it will be appreciated that the high-resolution feedstock can be, further or instead, advantageously used for other structures such as floors, roofs, and other structures within an object.

Figure 7:
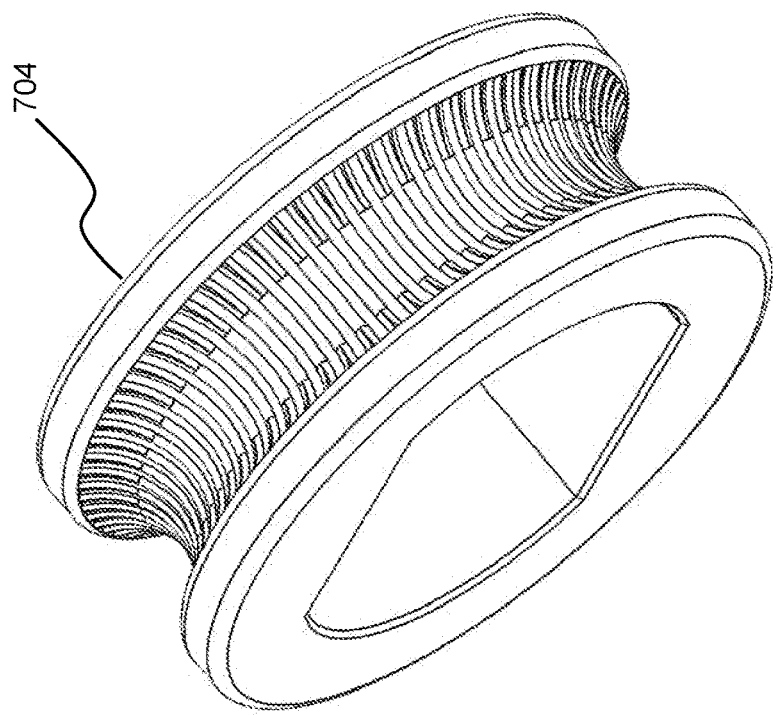
FIG. 7 is a perspective view of a number of drive wheels suitable for driving a feedstock in a fused filament fabrication (FFF) process.
Figure 7:
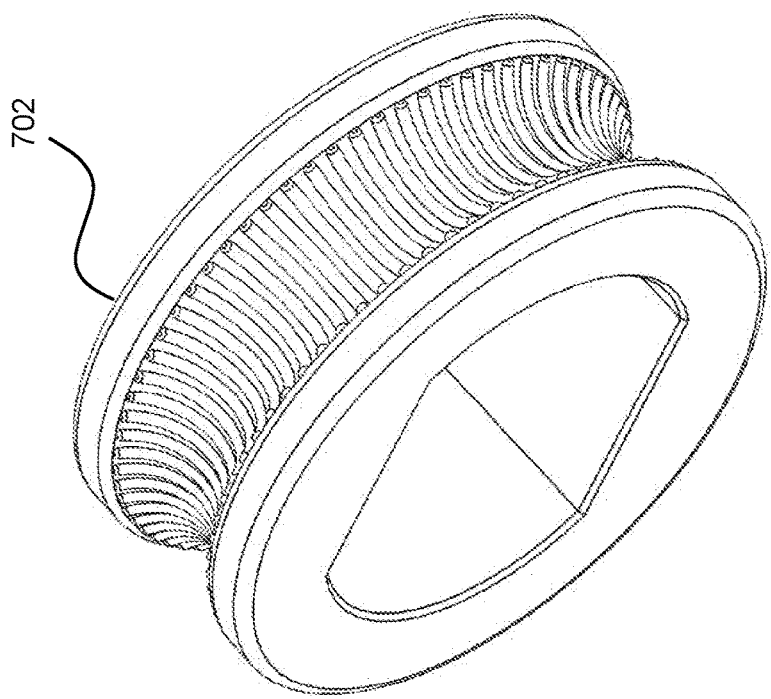

FIG. 7 is a perspective view of drive wheels 702, 704 suitable for driving a MIM feedstock in a FFF process. While the drive wheels 702, 704 provide adequate traction and drive for MIM feedstock using various binder systems including wax, thermoplastics, and so forth, the drive wheel 704 provides right angled gripping surfaces for greater engagement with the feedstock, as well as more convenient manufacturing (e.g., using a rope knurling process or the like) than the rounded engagement surfaces of the drive wheel 702.

In the field of metal injection molding, materials have high metal loading (e.g., >50% by volume, where greater metal loading can improve and accelerate sintering) and good flow properties at elevated temperatures. The properties of metal injection molding (or "MIM", or sometimes "PIM" when referring to powder metallurgy injection molding) materials are different, however, from those of paste-based materials known for use in extruding sinterable objects. It is believed that, because of these differences in properties, MIM materials have not been used in print-style fabrication of a green body or, more particularly, in FFF-type extrusion of green body material. The applicants have determined that a variety of commercially available MIM compositions may be usefully employed as a feedstock for fused filament fabrication. Significantly, while the particle sizes of 50 microns or more are not well-suited for use with existing FFF parts (e.g., nozzles with an exit diameter of 400 microns or less), solid rods of MIM material having a lower particle size have been demonstrated to extrude well using a conventional FFF machine with an extrusion diameter of 400 microns and a build material temperature of about 200 degrees Celsius. Nozzles have been fabricated and employed for these feedstocks using, e.g., a diameter ranging from about 400 microns to about 250 microns, and having an exit diameter near or between these values.

In general, a base powder may be formed of any powder metallurgy material. While the particular process, e.g., fused filament fabrication or stereolithography, may impose dimensional constraints or preferences, it appears that smaller particles are generally preferable. Various techniques have been developed for mass producing fine metal powders for use in MIM processes. In general, powders may be prepared by crushing, grinding, gas atomization, chemical reactions, electrolytic deposition, or combinations thereof. Any such powders from 1 to 20 microns in size may be used as the base powder of a MIM material as contemplated herein. Smaller particles may also be used where they are available and not prohibitively expensive. Further, or instead, larger particles may be used, provided that such larger particles are compatible with print resolution and physical hardware (e.g., an exit nozzle diameter) of a fabrication device.

MIM powders including stainless steel, titanium, titanium alloys, high-nickel alloys, nickel copper alloys, magnetic alloys, and the like are commercially available. Powders of the elements titanium, vanadium, thorium, niobium, tantalum, calcium, and uranium have been produced by high-temperature reduction of the corresponding nitrides and carbides. Iron, nickel, uranium, and beryllium submicrometer powders have been demonstrated by reducing metallic oxalates and formates. Exceedingly fine particles also have been prepared by directing a stream of molten metal through a high-temperature plasma jet or flame, to atomize the material. Various chemical and flame powdering processes may be used in part to prevent serious degradation of particle surfaces by atmospheric oxygen. More generally, any technique suitable for producing powdered metals or other materials for use in printing as contemplated herein may be adapted for the fabrication of a base powder. As a significant advantage, these techniques permit the processing and use of relatively high melting temperature metals at the significantly lower temperatures required for sintering. Thus, for example, powders of tungsten or steel alloys can be usefully sintered at temperatures below 700 degrees Celsius.

Binders may generally support a net shape after initial fabrication through sintering. In contemporary MIM materials, a binder system may include multiple binders that can be generally classified as primary binders (or, sometimes bulk binders) and secondary binders (or, sometimes, backbone binders). The primary binder can flow at elevated temperatures, and retain the shape of an object after an initial build (e.g., in normal atmospheric conditions). The secondary binder provides binding later into the sintering process and helps retain the shape of the object as the sintering progresses. The secondary binder(s) will be the last to gas off during a sintering process. The binder system may vary according to the intended application. For example, the binder system may be formed of polymers with a lower glass transition temperature or less viscosity for higher-resolution printing.

In general, binder systems for commercially available MIM materials are not engineered for use in fused filament fabrication processes. For example, these commercially available MIM materials include polymer mixes that are brittle at room temperature and, thus, generally unsuitable for extrusion in a fused filament fabrication process. In one aspect, feedstocks of the present disclosure may include a polymer binder system that is flexible at room temperature to facilitate forming the feedstock into a filament that can be, for example, wound onto a spool for extended, continuous feeding to a printer. Also, traditional MIM feedstocks may include many different additives, such as lubricants and release oils, to help injection molded parts through the molding process. However, these additives may not be desired for fused filament fabrication applications. Thus, additives used in traditional MIM feedstock may be replaced with components that make the feedstock more printable in fused filament fabrication.

The binder systems described herein may also or instead usefully be adapted for use with ceramic powders or other materials. The rheology of the extrudate is largely independent of the material loaded into the binder system, and depends more on particle geometry of the powder than on particle composition. As such, any reference to metal injection molding, MIM, or MIM materials should be understood to include ceramics, metal oxides, and other powders in a MIM-style binder system, unless a different meaning is expressly stated or otherwise clear from the context.

Other additives may also or instead be included in feedstocks described herein. For example, the feedstock may incorporate a getter for oxygen or other contaminants as described above, particularly when used as a support material. As another example, the feedstock may include a phase that is liquid at sintering temperatures, or some other surface-active additive to accelerate the sintering process.

A variety of engineered materials have been developed using powders and binders suitable for, e.g., die pressing or similar injection molding techniques. The applicants have found, through experimentation, that certain injection molding materials have suitable physical and thermal characteristics for use with a conventional fused filament fabrication machine, which can be used to form green bodies from the MIM material suitable for debinding and sintering.

In the discussion that follows, various different adaptations of MIM materials are described, with these adaptations generally addressing the challenges of using MIM materials as feedstock for rapidly forming parts through extrusion-based additive manufacturing techniques, such as fused filament fabrication. For example, feedstocks of the present disclosure may include a composite feedstock useful for achieving desired properties or, in certain cases, variations in properties in a feedstock and/or in a three-dimensional object formed through extrusion of the feedstock. As another example, feedstocks of the present disclosure may include an aggregate of low molecular weight polymers in a physically crosslinked relationship to one another, with such an aggregate of low molecular weight polymers facilitating bending (e.g., spooling) the feedstock while the physically crosslinked relationship may be reversible in a solvent to facilitate debinding. As yet another example, feedstocks of the present disclosure may include a primary binder including a high molecular weight polymer component useful for achieving high print quality and strength of a three-dimensional object while being chemically decomposable (e.g., depolymerizable) or dissolvable in a solvent for rapid debinding. As still another example, feedstocks of the present disclosure may be combined to form a part including a spatial gradient of a first primary binder and a second primary binder, the first primary binder and the second primary binder having different properties such that the spatial gradient forms a three-dimensional object having an advantageous combination of adequate structural support while also having a rapid overall debinding rate.

In general, a feedstock may include a powder of a material, a primary binder, and a secondary binder. The powder of the material may include a metal, a metal alloy, or a ceramic intended for a final, fabricated object. The primary binder retains a net shape during an initial fabrication process, and is removed during a debinding step. The secondary binder retains the shape of a debound object, and may be removed in a final densification process (e.g., a sintering process).

Useful metals for the powder of the feedstock may, for example, include copper and copper alloys, tungsten and tungsten alloys, and hard metals such as tungsten carbide or other carbides. Hard metals may be usefully coated with another metal, such as a cobalt or the like, to facilitate mixing and flow in the feedstock. As noted below, diamond or other superhard materials may also or instead be used in a similar manner.

Different materials in the feedstock may have different functional properties. Thermal properties may be usefully controlled through the use of specifically alloyed materials. For example, certain materials such as tungsten copper, molybdenum copper, aluminum nitride, and combinations thereof have good heat dissipation and are useful in heat sinks or in other thermal management applications. For these types of materials, where the independent constituents have vastly different densities, the two materials may be physically coupled, such as by coating copper particles with tungsten or molybdenum to obtain more uniform particles that more readily remain distributed throughout a flowable medium. Similarly, some alloys have low thermal expansion that may be usefully employed, e.g., for bimetallic structures that constrain thermal deformation, for forming hermetic seals in thermally varied environments, or other applications where low or controlled thermal expansion is desired. For example, a variety of nickel iron alloys are commercially available and suitable for fabrication of objects with controlled thermal expansion.

Magnetic properties may also or instead be controlled through the use of magnetic alloys, typically using elements such as iron, nickel and/or cobalt. For example, useful magnetic alloys suitable for delivery in an FFF context may include FeSi, FeNi, neodymium iron boron, and samarium cobalt.

Mechanical properties of a three-dimensional object formed through FFF may also or instead be controlled through various strengthening techniques. For example, oxide dispersion strengthening or "Zener pinning" may be used to strengthen sintered materials through the introduction of oxides that limit grain growth during sintering to result in a microstructure having greater strength. A variety of suitable oxides, such as Al2O3 or Y2O3, may be combined with other pre-alloyed powders to produce an oxide dispersion strengthened (ODS) material with greater strength and hardness than a non-ODS counterpart. More generally, nano-dispersions of oxides, carbides, nitrides or borides may be used to strengthen the resulting material. Other techniques may also or instead be used to strengthen a MIM-based material. For example, a feedstock containing carbon nanotubes can be extruded and sintered while the carbon nanotubes remain intact, thus providing a useful strengthening agent for FFF parts. In another aspect, materials may be hardened with diamonds or the like using, e.g., diamond powder coated with a metal such as nickel, cobalt, or copper. The coating of soft metal helps to prevent segregation prior to sintering and creates a more uniform distribution of two different phases (hard diamond and soft metallic).

Any of the foregoing may be disposed in a composition containing a primary and secondary binder suitable for extrusion in a FFF process, either alone or in combination with other alloys or additives according to desired attributes of the final, fabricated object. In one aspect, a variety of feedstock types may be provided (where the feedstocks have mutually compatible binder systems, e.g., suited for a common debind and sinter mechanism), and an object may be fabricated from a computer model that specifies different characteristics in different locations, where the appropriate material is deposited in the appropriate location according to the computer model. Thus, for example, features such as magnetism, density, electrical conductivity, thermal expansion, thermal conductivity, and strength may be deployed at controlled locations within an object according to a user-provided model.

In certain instances, the feedstocks extruded to form three-dimensional objects according to one or more of the methods described herein may be subjected to significant forces at various stages of the process, with storage, handling, and fabrication presenting particular risk for inadvertent application of destructive forces to a feedstock. As an example, feeding a feedstock into a three-dimensional printer can include gripping the feedstock (e.g., using one or more of the drive wheels 702, 704 in FIG. 7). However, in instances in which the binder system of the feedstock is soft or brittle, the application of a large gripping force to a feedstock may deform or break the feedstock and, conversely, the application of a low gripping force may be insufficient to move the feedstock through a nozzle. Thus, as described in greater detail below, a feedstock may advantageously include a jacket disposed about a core to reduce the likelihood of damage to the feedstock prior to or during extrusion while nevertheless facilitating the use of powder material and/or binder systems desirable for formation of a three-dimensional object.

Figure 8A:
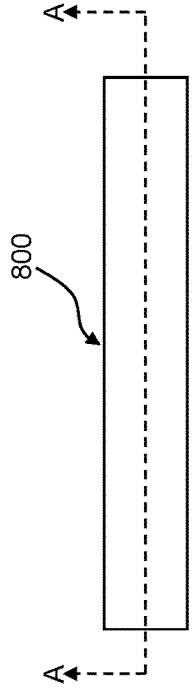
FIG. 8A is a side view of a feedstock for a fused filament fabrication (FFF) process.
Figure 8B:
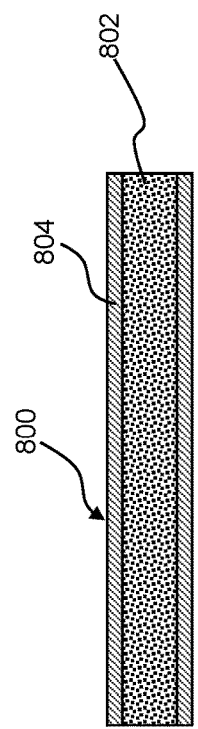
FIG. 8B is a side cross-sectional view of the feedstock of FIG. 8A along line A-A in FIG. 8A.
Figure 8C:
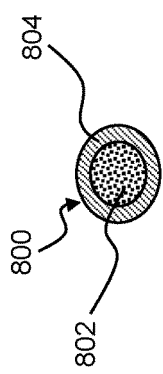
FIG. 8C is an end view of the feedstock of FIG. 8A.

Referring now to FIGS. 8A-C, a feedstock 800 may include a core 802 and a jacket 804 about the core 802. The jacket 804 may have a hardness greater than a hardness of the core 802 at an extrusion temperature of the feedstock 800. As used herein, the term "hardness" should be understood to include resistance to shape change (e.g., a permanent shape change) under application of a substantially compressive force. Thus, for example, hardness of the jacket 804 relative to hardness of the core 802 may be expressed as differences on any one or more of various different scales of hardness known in the art. As a specific example, the jacket 804 may have a Shore hardness greater than a Shore hardness of the core 802, with the Shore hardness of each material measured on the same scale (e.g., the Shore A scale or the Shore D scale).

The use of the Shore hardness as a measurement of mechanical performance of the feedstocks is intended to be illustrative of a more general set of mechanical properties of materials representing various, different aspects of the deformation of a material. For example, the Shore hardnesses are proportional to the force needed to deform a material with an indenter, and are thus a measurement of the amount of force a gripping mechanism can apply to a material before the material fails. Other important metrics may, further or instead, include tensile elongations of materials of the core 802 and the jacket 804, which will generally quantify the ability of such materials to tolerate the deformation induced by gripping mechanisms without catastrophic failure. Additionally, or alternatively, other measurements may be used to quantify the relative mechanical performance of the core 802 and the jacket 804. Other useful metrics may include Rockwell hardnesses, the area under the curve of a stress-strain measurement for a material, Izod impact energies, and Charpy impact energies. In general, the jacket 804 may have a quantifiably higher mechanical performance (e.g., as measured according to one or more of the parameters described herein) than the core 802.

In general, the core 802 and the jacket 804 may advantageously decouple certain physical characteristics of the feedstock 800 related to proper extrusion of the feedstock 800 from certain physicochemical characteristics required in a three-dimensional object formed from the extrusion of the feedstock 800. As an example, the core 802 may include a binder system and a powder material suspended in the binder system, as may be generally useful for imparting certain physicochemical properties to a three-dimensional object such that the three-dimensional object may be processable into a dense, final part. With the powder suspended in the binder system, however, the core 802 may be brittle or otherwise susceptible to unintended damage by forces required to extrude the feedstock 800 through a nozzle, such as any one or more of the nozzles described herein. Accordingly, the jacket 804 may include a second polymer useful for imparting the feedstock 800 with overall physical properties such that the feedstock 800 may be sufficiently robust to withstand forces associated with transport, handling, storage, extrusion, or combinations thereof. As a specific example of a useful physical property provided by the jacket 804, at a temperature of about twenty-three degrees Celsius, the feedstock 800 may be spoolable without fracture on a spool with a diameter of at most about thirty-six inches and at least a diameter greater than a diameter of the feedstock—a physical characteristic useful for storing and transporting the feedstock 800 and, further or instead, for continuously feeding the feedstock 800 during a fabrication process. As an additional or alternative specific example of useful physical property provided by the jacket 804, at a temperature of about twenty-three degrees Celsius, the feedstock may be substantially rigid—a physical characteristic useful, for example, for facilitating handling of the feedstock 800.

The core 802 may include a powder material, such as any one or more of the powder materials described herein. Thus, for example, the powder material may include a sinterable or otherwise thermally processable powder. The powder material may have a concentration in the core 802 such that shrinkage of a three-dimensional part formed from the feedstock 800 is acceptable (e.g., to within specified design tolerances). Thus, as a more specific example, the powder material can have a concentration in the core within ±10 volume percent of a tap density of the powder material. As used herein, the tap density of particles is the bulk density of a powder of the particles after a compaction process specified in ASTM B527, entitled "Standard Test Method for Tap Density of Metal Powders and Compounds," the entirety of which is incorporated herein by reference.

The binder system in the core 802 may include a primary binder and a secondary binder. The primary binder and the secondary binder may be any one or more of the respective primary binders and secondary binders described herein, unless otherwise specified or made clear from the context. Thus, as an example, the primary binder may retain a net shape of the powder material during a primary debind process (e.g., catalytic debind process) applied to a three-dimensional object formed from extrusion of the feedstock 800. Further, or instead, the secondary binder may retain a net shape of the powder material during a secondary debind process, which may include a thermal sintering cycle. As a specific example, the secondary binder may include polypropylene, polyethylene, poly(methyl methacrylate) or another high molecular weight polymer.

At least one of the primary binder and the secondary binder of the binder system in the core 802 may include a first polymer. The first polymer may be any one or more of the polymers described herein as being useful for a primary binder and/or a secondary binder, as the case may be. That is, the first polymer may be useful for imparting certain physicochemical properties to a three-dimensional object formed from extrusion of the feedstock 800 and, optionally, through one or more stages of processing as the three-dimensional object is densified into a final part. As an example, therefore, the first polymer may be polymer (e.g., polystyrene) useful for providing sufficient strength to a three-dimensional object formed from extrusion of the feedstock 800.

The jacket 804 may include a second polymer. The second polymer in the jacket 804 may, in some instances, complement one or more physical properties of the first polymer in the core 802. That is, while the first polymer may be selected for certain physicochemical properties imparted by the first polymer to a three-dimensional object formed from extrusion of the feedstock 800, the second polymer may be selected to achieve certain physical properties in the feedstock 800 prior to extrusion, or to enhance the performance of the extrusion process.

In certain instances, the second polymer may be selected to impart strength to the feedstock 800 such that the feedstock 800 may better suited to withstand forces and/or temperatures that may be encountered during transportation, handling, and extrusion of the feedstock 800. As an example, the second polymer may have a molecular weight greater than a molecular weight of the first polymer (or, in instances in which the binder system includes two or more polymers, greater than an average of molecular weights of two or more polymers). As a specific example, the second polymer may be a high molecular weight polymer (e.g., polystyrene or polypropylene). With a higher molecular weight, the second polymer of the jacket 804 may have a higher melt temperature than the first polymer of the core 802. Further or instead, the second polymer of the jacket 804 may have a polymer chain longer than a polymer chain of the first polymer of the core 802. Additionally, or alternatively, the second polymer may have a Shore D hardness greater than a Shore D hardness of the first polymer at the extrusion temperature for the feedstock 800.

In certain implementations, one or more components of the feedstock 800 may be distributed in both the core 802 and the jacket 804, as may be useful for reducing sharp transitions in material properties. Thus, in some instances, the jacket 804 may contain an amount of the powder material. For example, a volumetric percentage of the powder material in the jacket 804 may be less than a volumetric percentage of the powder material in the core 802. Additionally, or alternatively, the binder system may include the second polymer. That is, properties of the second polymer that make it useful as part of the jacket 804 may be useful as at least a portion of the secondary binder used to support a net shape of a three-dimensional object through densification. In general, however, the volumetric percentage of the second polymer in the jacket 804 may be greater than a volumetric percentage of the second polymer in the core 802.

Figure 9:
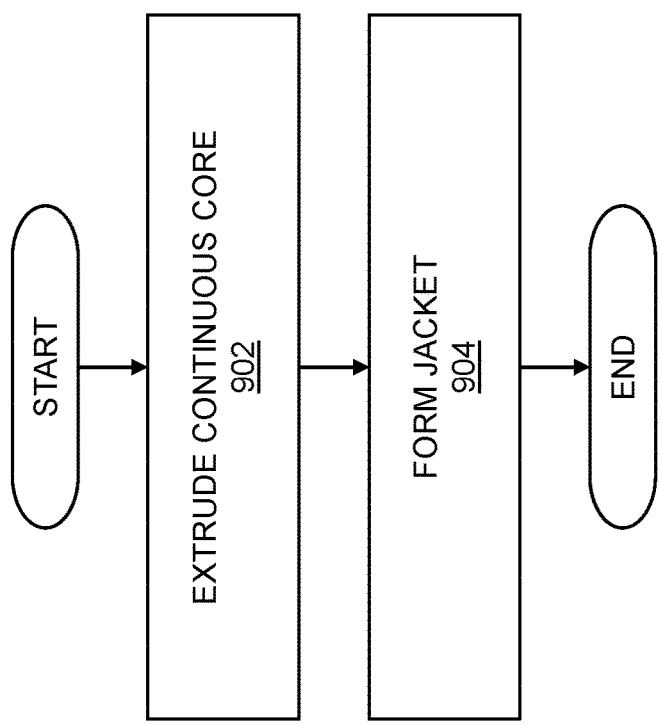
FIG. 9 is a flow chart of an exemplary method of forming a composite feedstock.

FIG. 9 is a flow chart of an exemplary method 900 of forming a composite feedstock. In particular, unless otherwise specified or made clear from the context, it should be appreciated that the exemplary method 900 may be used to form the feedstock 800 (FIG. 8) for extrusion by any one or more of the systems described herein and according to any one or more of the methods described herein.

As shown in step 902, the exemplary method 900 may include extruding a continuous core including a binder system and a powder material. The power material may include a powder of any one or more of the materials described herein and, more specifically, may include a powder of a metal, a metal alloy, a ceramic or combinations thereof. Further, or instead, the powder may include a sinterable powder. As may be useful for limiting shrinkage of a three-dimensional part during densification into a dense, final part, the powder may have a concentration in the continuous core within ±10 volume percent of a tap density of the powder material. The binder system, likewise, may include any one or more of the binder systems described herein, unless otherwise specified or made clear from the context. Accordingly, it should be understood that the binder system may include a primary binder and a secondary binder, the primary binder suitable for retaining a net shape of the powder material during a primary debind process, the secondary binder suitable for retaining a net shape of the powder material during a thermal sintering cycle, and at least one of the primary binder and the secondary binder including a first polymer. The primary debind process may include any one or more of chemical debinding, supercritical debinding, catalytic debinding, thermal debinding, and wick debinding.

As shown in step 904, the exemplary method 900 may include forming a jacket of a jacket material about the continuous core. For example, forming the jacket may include coextruding the jacket material around the continuous core. Further, or instead, forming the jacket may include spraying the jacket material onto the continuous core or dipping the continuous core in a liquid form of the jacket material. At a predetermined temperature (e.g., about twenty-three degrees Celsius), the jacket material may have a Shore hardness greater than a Shore hardness of the continuous core. In this way, therefore, the jacket can protect the continuous core from forces that, in the absence of the jacket, would be likely to damage the continuous core or otherwise interrupt extrusion of the core to form a three-dimensional object.

In certain instances, the binder in the core may include a low molecular weight polymer, and the jacket may include a crosslinker for the low molecular weight polymer (e.g., a polymer with a molecular weight of no greater than 100,000 g/mol) that can initiate crosslinking of the low molecular weight polymer to provide a greater strength and/or effective molecular weight in an extruded material. Cross-linking may include any creation of ionic or covalent bonds among polymer chains, which may be used, e.g., to increase hardness and melting point of polymeric molecules. In general, cross-links can be formed by chemical reactions initiated, e.g., by heat, pressure, change in pH, electromagnetic energy and so forth. For example, crosslinking to achieve a further polymerization of the low molecular weight polymer may be triggerable during extrusion by an application of heat, light, mechanical energy or the like, which may, e.g., activate the crosslinker in the jacket or initiate mixing or the like between the jacket and the core. For example, the crosslinking may be triggered by an application of heat at an extrusion temperature for the feedstock, e.g., at least one hundred degrees Celsius or some other suitable temperature. In another aspect, the crosslinker may include a liquid crosslinker or the like that is encapsulated within the jacket in a material that can be disrupted or otherwise stimulated to release the crosslinker, e.g., with the application of ultrasound energy as the feedstock is extruded. The appropriate polymer, crosslinker and crosslinking conditions will be highly system dependent. A variety of suitable crosslinking techniques such as polymerization of a partially polymerized resin with a crosslinking reagent are known in the art, and may be adapted for use with a core of polymeric binder material and a jacket containing a crosslinker as contemplated herein.

Conventional MIM feedstock is relatively brittle. Thus, even where such materials are suitable for use with FFF-type equipment, the brittle nature of conventional MIM feedstock is not well suitable for storing, handling, or dispensing non-linear segments of MIM filament to facilitate continuous fabrication. More specifically, even where a binder system or matrix of a conventional MIM material is capable of substantial deformation to accommodate coiling, spooling or the like, a composite of the matrix that is loaded with metal powder or the like will reach a local elastic limit much sooner than the unloaded binder matrix. To address this challenge, the binder system may include a polymer with a high elastic limit such as an elastomer. This may, for example, include a thermoplastic elastomer such as a thermoplastic polyurethane (TPU), polyamide-polyether copolymers, and other similar polymers. These polymers may be unsuited for use in a FFF process because they are soft, and tend to buckle under loads in a manner that interferes with driving through an extrusion system. However, by loading these otherwise unsuitable polymers with a powder metallurgy material or the like, the stiffness of the composite can be improved to permit use in extrusion generally, and FFF processes in particular. Thus, although thermoplastic elastomers are not used in conventional MIM feedstock, and although thermoplastic elastomers are not well-suited to a FFF processes, these two categories of materials can be advantageously combined to yield a flexible feedstock suitable for coiling, and further suitable for extrusion in a FFF process to fabricate a green part for debinding and sintering into a metal object. This may be adapted for use with a wide range of materials including the various alloys described herein and any other metal alloy or the like suitable for mixture with a polymer for extrusion, and for subsequent debinding and sintering into a final, net shape object.

Another challenge to spooling MIM filament is that, even where a more flexible binder system is used, the filament will tend to break at the interface between the binder system (the polymer) and powdered particles (e.g., particles of a metal alloy), which tend to form a weak bond to one another. A variety of techniques are known in polymer chemistry for compatibilization of polymers with polymers or other materials to create interactions that mechanically overcome immiscibility between the two and provide a better blended combination. Coupling agents similarly provide bonding agents between polymers and other materials. In general, any molecule or material with a first moiety having an affinity for the powder and a second moiety having an affinity for the polymer may be used to enhance the bond between the two as contemplated herein. One such agent that compatiblizes a metallic powder blended into a non-polar binder system is stearic acid—possessing both non-polar and polar moieties that bond with the non-polar binder system and the metal surface, respectively. Similarly, polymer-compatible coatings—or a pre-coating of the thermoplastic elastomer from the binder system—may be added to the powder to facilitate improved mechanical bonding between a powdered loading material (e.g., a metal alloy) and a binder system. Still more generally, any materials and/or techniques that promote mechanical coupling between an otherwise immiscible polymer and metal powder may be used to yield a more flexible composite with greater strength under flexure—particularly resistance to fracture at the interface between materials—that is suitable for spooling and use in a FFF process as contemplated herein.

According to the foregoing, in one aspect there is disclosed herein a build material for additive manufacturing, e.g., using fused filament fabrication, comprising a binder system that contains a first polymer such as a thermoplastic elastomer, the binder system loaded greater than 50% by volume with a powder formed of a metal or metal alloy. The build material may further include a bonding agent to improve a mechanical bond between the binder system and the powder.

The binder system may include a second polymer forming a primary binder for the build material that can be removed from the build material using, e.g., chemical debinding, supercritical debinding, wick debinding, catalytic debinding, or thermal debinding. In another aspect, the thermoplastic may be the primary binder, or the thermoplastic elastomer may include a thermoplastic elastomer alloy with components that can be selectively removed by debinding as generally contemplated herein. In another aspect, the polymer may form a secondary binder (e.g., for a brown part) within the binder system, and a primary binder may be formed of paraffin wax, plastic, oil, or some other conventional primary binder material suitable for debinding from the build material.

In general, any combination of polymers, powders and bonding agents may be used, preferably to yield a filament with diameter of between 1 and 4 mm (such as FFF industry standards of 1.75 mm or 3.0 mm) and a minimum bending radius before fracture of no greater than twelve inches, or no greater than six inches, e.g., for more compact spooling. In another aspect, a FFF process may be adapted for use with less coilable materials by using large-radius spools to accommodate a larger radius of curvature for filament feedstock.

In another aspect, the primary or secondary binder may include a highly-branched polymer. The melt strength of commercially available liquefied metal injection molding materials is generally too low for fused filament fabrication. Further, the tensile elongations of these materials are also low, limiting feeding mechanisms. In the case of injection molding of such materials, a high emphasis is placed on lowering viscosities to achieve better flow during the injection process, and the engineering of such materials to achieve high melt strengths was not a design goal, leading to the use of linear polymers in injection molding applications.

However, it has been determined that the binder system for extruded MIM materials may usefully incorporate highly branched polymers that, in proper combination with a powdered metal or similar build material, form a composite with advantageous melt, extrusion and debind properties. Thus, in one aspect, a MIM material with a secondary binder composed in part of a highly-branched polymer is disclosed. The branched polymeric species may be branched variants of the polymers common in the art as secondary binders for MIM materials. In one embodiment, if a moderate enhancement of melt strength and ductility is desired, a high-density polyethylene secondary binder may be replaced with a linear low-density polyethylene secondary binder exhibiting a moderate amount of branching. If a larger enhancement of these properties is desired, an HDPE secondary binder may be replaced with a low-density polyethylene (LDPE), which exhibits a substantially greater amount of branching. Increases in branching are generally attended by increases in viscosity. It will be readily apparent to one skilled in the art that the resulting ductility and melt strength of the binder may be continuously varied with increasing branching of the secondary binder via suitable chemical synthesis techniques, that any number of branched polymers may be blended with various linear polymers to achieve suitable properties. Further, the use of a branched secondary binder is not limited to polyethylene grades, but may be usefully applied to any other secondary binder systems, including polypropylene and polymethylmethacrylate.

In another aspect, if the primary binder is of sufficiently high molecular weight, such that branching will substantially affect the mechanical and rheological properties of the MIM material, the highly-branched species may be the primary binder. Such primary binders include the polyoxymethylene (often called POM or polyacetal) binders used in catalytic debinding, as well as the high molecular weight primary binders disclosed herein for obtaining higher melt strength materials that hydrolyze during debinding (e.g. thermoplastic polysaccharides, polyglycolic acid, and poly (lactide)-co-(caprolactone)).

The following description contemplates a number of polymer-based binder systems that can advantageously be employed in a build material for an extrusion-based additive manufacturing process for sinterable, net shape objects. In prior art in metal injection molding materials, a primary binder composed of low molecular weight molecules is typically used as it provides a sufficient amount of green body strength and simultaneously allows the mold to be filled properly during an injection molding process. In that context, the low molecular weight molecules also permit the primary binder to be dissolved quickly during primary debinding. Typical molecular weights used for such applications are between several hundred and several thousand g/mol, with few primary binder components approaching or exceeding ten thousand g/mol in industrial practice. Typical melt flow rates for such low molecular weight molecules are above around 100 g/10 minutes in ASTM D1238 testing at 200° C. with a 5-kg load. Indeed, many such binder components exhibit a melt flow rate substantially higher than this, with melt flow rates being above 400 g/10 min at 190° C. with a 2.16 kg load.

However, in fused filament fabrication and other similar extrusion-based additive fabrication processes, the requirements are different. For example, a high flow rate may be an impediment to controlled extrusion and/or shape retention of a fabricated object. Thus, for these processes, a reasonably high strength and viscosity permits mechanical extrusion and advantageously retains shape for consistent, high-quality results. Similarly, a reduced thermal expansion coefficient may be desired to prevent warping, cracking or other thermally induced stress deformation. While it is possible to obtain these properties by avoiding low molecular weight polymers in the primary binder, the use of higher molecular weight polymers comes with a complementary disadvantage in the form of slower debind rates. In one aspect, some of the build materials described herein can resolve these apparently contradictory design constraints using a moderate-to-high molecular weight component in the primary binder, even in a small volume or weight fraction, provided that the polymer has a corresponding solvent or the like that can maintain debind rates at a practical level. A number of techniques and polymer systems are described below that use this approach to achieve practical, extrudable, sinterable build materials with a dissolvable or otherwise chemically-removable polymeric primary binder.

The terms "high molecular weight" and "low molecular weight" are used frequently in the following description to distinguish between many of these polymer systems by generally dividing polymers into those with molecular weights above and below a value somewhere between ten thousand and one-hundred thousand grams/mol. In general, these are relative terms without precise delineation. For example, in the context of polymers and similar materials, a low molecular weight component (e.g., a polymer) may be a component with a molecular weight of less than about ten thousand grams/mol, a moderate molecular weight component may be a component with a molecular weight of between about ten thousand grams/mol and one-hundred thousand grams/mol, and a high molecular weight component may be a component with a molecular weight greater than about one-hundred thousand grams/mol. However, because these terms are relative, different sources may ascribe different boundaries to these groups, and the boundaries may also vary according to particular polymer systems. That is, one polymer may begin to exhibit properties of a high-molecular weight component—such as high viscosity, high melt temperature, high hardness and so forth—at a very different molecular weight than another polymer or polymer system. Thus, these terms should be viewed in context to represent, e.g., general ranges rather than specific points of division for the properties of polymeric systems. For example, the term "high molecular weight" may be used in a relative sense to indicate a greater molecular weight than another polymer or component, or the term "high molecular weight" may be used to characterize the properties of a component in terms of flow, hardness and so forth. For example, in the context of extrudable build materials, a "moderate molecular weight" component may be any component exhibiting a melt flow rate between around ten to one hundred g/10 min. in ASTM D1238 testing at 200° C. with a 5-kg load, and a "high molecular weight" component may be any component with a melt flow rate less than ten g/10 min. under similar conditions. Thus, mechanical properties may be a more useful guide to distinguishing among different classes of polymers that are used in the polymeric binder systems contemplated herein. However, the molecular weight can be readily and accurately determined using a number of well-known techniques, and where molecular weight provides a useful, relative guide to mechanical, rheological, and thermal properties (e.g., hardness, strength, viscosity, melt temperature) and chemical properties (e.g., dissolvability), molecular weight is used herein as a proxy for these characteristics of a build material to provide a modicum of specificity.

Figure 10:
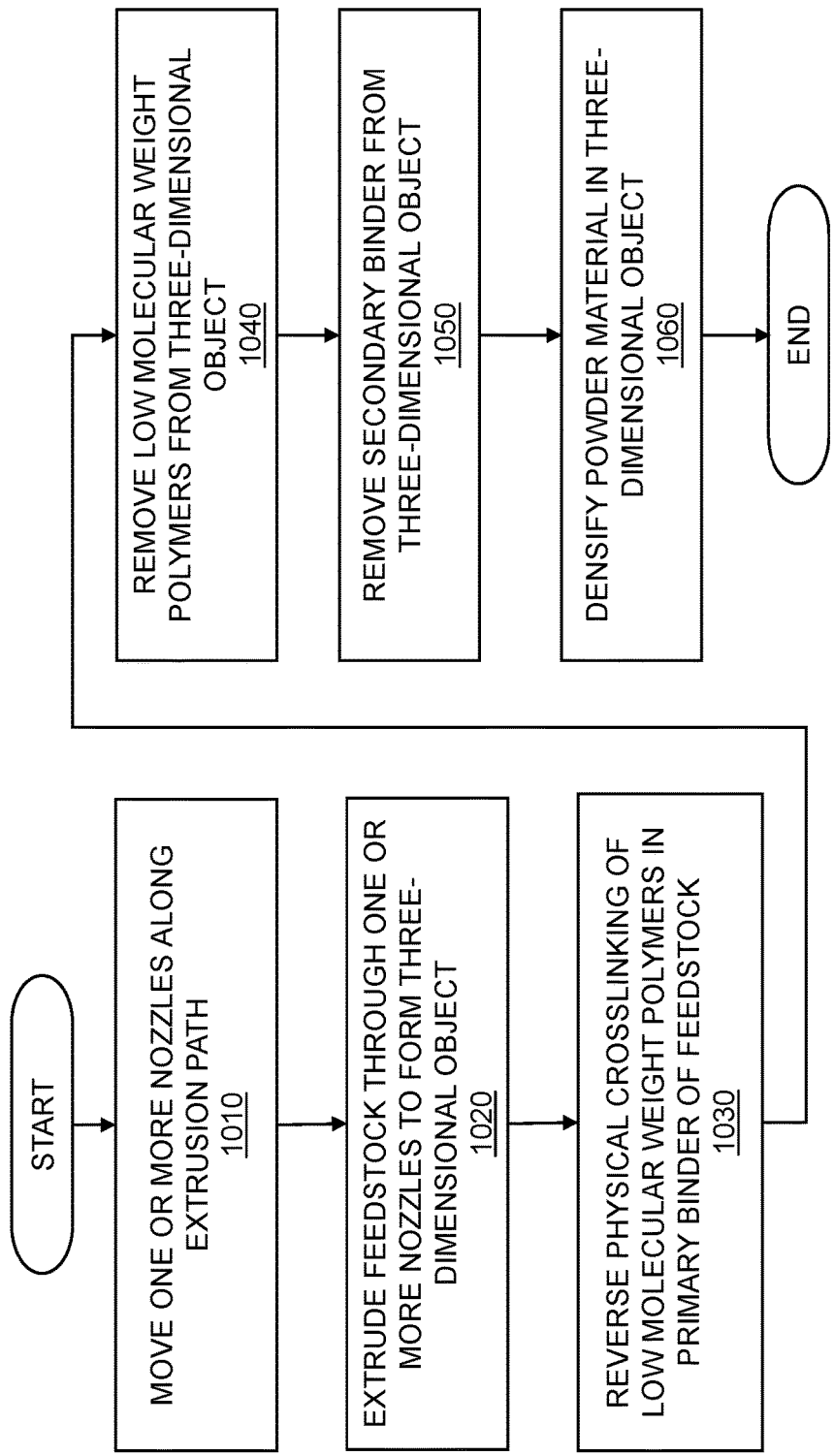
FIG. 10 is a flow chart of an exemplary method of additive manufacturing using a spoolable feedstock.

FIG. 10 is a flow chart of an exemplary method 1000 of additive manufacturing using a spoolable feedstock. The feedstock may include a binder system and a powder material dispersed in the binder system. The binder system may include a primary binder and secondary binder separately removable from a three-dimensional object formed from the feedstock. The primary binder may include an aggregate of low molecular weight polymers in a physically crosslinked relationship to one another, and the physically crosslinked relationship of the aggregate of low molecular weight polymers may be reversible through exposure to a debind solution. In general, reversibility of the physical crosslinking may be advantageously used to provide different material properties at different stages of an extrusion process. More specifically, as described in greater detail below in the context of the exemplary method 1000, the physically crosslinked relationship of the aggregate of low molecular weight polymers may be useful for achieving advantageous physical properties of the feedstock—such as strength and/or flexibility useful for moving and handling the feedstock as part of a continuous process—while reversing the physically crosslinked relationship in a solvent may facilitate rapid removal of the primary binder during a debinding process applied to a three-dimensional object.

As shown in step 1010, the exemplary method 1000 may include moving one or more nozzles along an extrusion path relative to a build plate. For example, such movement of one or more nozzles can be based on a computer model according to any one or more of the various different methods described herein.

As shown in step 1020, the exemplary method 1000 may include extruding a feedstock through the one or more nozzles, with the extrusion of the feedstock forming a three-dimensional object along the extrusion path. The three-dimensional object may include, for example, a plurality of layers, each layer coupled to at least one other layer, and each layer including the components of the feedstock extruded to form the respective layer. The feedstock may include a binder system and a powder material dispersed in the binder system such that the three-dimensional object formed through the extrusion of the feedstock is a green part. For example, the binder system may include a primary binder and a secondary binder separately removable from the three-dimensional object through subsequent processing, as described in greater detail below. While extrusion of a single feedstock is described for the sake of clarity of explanation, it should be appreciated that a plurality of feedstocks may be extruded as necessary to impart variations in one or more properties (e.g., physicochemical properties) along the three-dimensional object.

The binder system may include a primary binder including an aggregate of low molecular weight polymers in a physically crosslinked relationship to one another. This physical crosslinked relationship may be useful for imparting strength to the feedstock to facilitate continuously or substantially continuously extruding the feedstock. As described in greater detail below, the physically crosslinked relationship may be reversible through exposure of the primary binder to a solvent.

The primary binder may include a block copolymer which, in general, may include regions arrangeable to form the physically crosslinked structure useful for imparting strength to the feedstock. As an example, the block copolymer may include a first rigid, crystalizable region, a flexible region, and a second rigid, crystalizable region. It should be appreciated that the first crystalizable region and the second crystalizable region may have the same composition or a different composition. More generally, it should be understood that the block copolymer has a structure such that, in the physically crosslinked relationship, the rigid, crystalizable regions of a given block copolymer are linked with the rigid, crystalizable regions of at least one other block copolymer. The flexible region of the block copolymer may provide flexibility in the physically crosslinked structure. As an example, a block copolymer useful in the primary binder may comprise a polystyrene block. For example, a block copolymer may comprise a polystyrene block and a polybutadiene block.

The flexibility imparted to the feedstock by the primary binder may facilitate forming the feedstock as a spoolable material. As an example, the feedstock may be a filament for use in a fused filament fabrication process and may have a diameter of greater than about 1 mm and less than about 4 mm, although larger or smaller diameters are possible. Further, or instead, the filament may have a bending radius at fracture of greater than a diameter of the filament and less than about 30 cm, which can be useful for arranging the filament in a spool having a size suitable for efficient storage, shipping, and handling while providing an amount of material useful in a continuous process. As used herein, the bending radius should be understood to be a radius of a circle about which the filament may be wrapped. Thus, the bending radius at fracture should be understood to be the minimum radius of a circle about which the filament may be wrapped before the stresses associated with wrapping the filament about the circle cause the filament to fracture.

More generally, extruding the feedstock through the one or more nozzles may include unspooling a spool of the feedstock and moving the feedstock (e.g., using a drive train) toward the one or more nozzles. Unspooling the feedstock in this way may be performed at a rate substantially equal to an extrusion rate of the feedstock through the one or more nozzles such that the feedstock is continuously fed through the one or more nozzles.

The powder material of the feedstock may be any one or more of the powder materials described herein. For example, the powder material may include at least one of a metal, a metal alloy, or a ceramic. In certain instances, the powder material may include a plurality of components (e.g., component materials of stainless steel) thermally processable to alloy with one another in the final part. Further, or instead, the powder material may have a density in the feedstock within ±10 volume percent of a tap density of the powder material. It should be appreciated that such loading of the powder material may be useful for producing a finished part having an acceptable amount of shrinkage.

As shown in step 1030, the exemplary method 1000 may include reversing a physically crosslinked relationship of an aggregate of low molecular weight polymers of a primary binder of the binder system. For example, reversing physical crosslinking of the aggregate of low molecular weight polymers of the primary binder may include exposing the primary binder to a debind solution. As an example, the debind solution may include one or more of acetone or trans-dichloroethylene, which may be particularly suitable for reversing physical crosslinking in a polystyrene and, more specifically, in polybutadiene-polystyrene block copolymer.

As shown in step 1040, the exemplary method 1000 may include removing the low molecular weight polymers of the primary binder from the three-dimensional object. The secondary binder may include any of various different polymers suitable for retaining a net shape of the three-dimensional object through processing following debinding of the primary binder. As an example, the secondary binder may include a thermoplastic (e.g., a thermoplastic elastomer). Additionally, or alternatively, the secondary binder may include polypropylene, polyethylene, and poly(methyl methacrylate). In general, it should be understood that any one or more of various different debinding processes may be used to remove the secondary binder from the three-dimensional object, with the nature of the debinding process being a function of, among other factors, the composition of the secondary binder. Thus, for example, the material of the secondary binder may be removable from the powder material using a thermal debinding process. Further, or instead, the secondary binder may be removable from the three-dimensional object through one or more of chemical debinding, supercritical debinding, wick debinding, catalytic debinding, or thermal debinding.

As shown in step 1050, the exemplary method 1000 may include removing a secondary binder from the binder system.

As shown in step 1060, the exemplary method 1000 may include densifying the powder material in the three-dimensional object to form a final part. For example, the powder material can be densified as part of a sintering process. Further, or instead, with one or both of the primary binder and the secondary binder debound from the three-dimensional object, the three-dimensional object may be a porous structure and liquid metal infiltration into the porous structure may be usefully applied to densify the three-dimensional object into a final part.

In general, metal injection molding (MIM) build materials with wax/polymer binder systems can be difficult to handle at elevated temperatures due to low strength at melt or working temperatures, e.g., above the melt or glass transition temperature of one or more components of the blend. In a fused filament fabrication (FFF) context in particular, however, the low melt strength of conventional MIM build materials can create difficulties when fabricating bridges, overhangs, or other structures that rely on physical stability of the print medium during deposition. Similarly, a low melt strength can make it difficult to control extrusion due to uncontrolled flow or oozing at the nozzle exit, e.g. during starting and stopping of an extrusion. Conventional FFF feedstock is formed primarily or exclusively of high molecular weight components that alleviate these issues, unlike MIM feedstock that typically contains wax or other materials with less favorable working characteristics at elevated temperatures.

For MIM materials, a low molecular weight component is typically used as a primary binder to facilitate dissolution with chemical or supercritical debinding. By contrast, one known catalytic debinding system is based on approximately 90% polyacetal (also referred to as polyoxymethylene or POM), along with small amounts of polyethylene and slip additives. The primary binder in such feedstock reacts directly with a gas and decomposes monomer-by-monomer. While the binder in this material may have a higher molecular weight, it comes with significant disadvantages. Specifically, this binder system requires a high-temperature (~100 degrees Celsius) nitric acid vapor for debinding in a process that produces formaldehyde as one of its outputs.

An improved feedstock provides the advantages of high molecular weight components—specifically a high-strength melt—along with the convenience of a non-hazardous, rapid, reactive debind via dissociation of the binder into smaller molecules. In one aspect, thermoplastic saccharides can be used as a primary binder that is chemically decomposed (e.g., depolymerized) in an aqueous solution using enzymes catalyzing the decomposition reaction. Amylases are one such class of catalysts that can facilitate the hydrolytic decomposition of polysaccharides. As a further advantage, this debinding process creates a waste stream of aqueous monosaccharides that can be safely handled and disposed of in a home or office environment. Other polymers provide similar advantages, and are suitable for use as a primary binder in a FFF/MIM build material.

For example, many polyesters can be hydrolyzed in aqueous media, including polylactic acid (PLA) and polyglycolic acid (PLGA), the rate and mechanisms of the hydrolysis being a strong function of pH, temperature, and molecular weight of the polyesters. By way of more specific example, under appropriate conditions polyglycolic acid can be decomposed into monomers via hydrolysis in acidic solution. Such a hydrolysis will form a well-defined waste stream of monomers. For PLGA, this may not sufficiently enhance diffusive kinetics and other approaches may be required or desired. For example, for PLGA the larger molecular weight components may initially be decomposed into smaller molecular weight components more rapidly by conducting the hydrolytic decomposition in alkaline solution, where the PLGA is known to decompose via random ester cleavage. A combination of a pH where oligomers of the primary binder are soluble, along with fast decomposition kinetics and mechanisms can provide for a rapid debind of otherwise high molecular weight polymers. For PLGA, alkaline solutions dissolve PLGA oligomers, creating favorable dissolution conditions overall. One may similarly engineer the decompositions of any hydrolyzing polyester or other polymer to yield a sufficiently fast debinding rate.

Other polymers may also or instead be used to further enhance properties of the build material to provide greater flexibility, e.g., so that a filament of the build material can be spooled or otherwise stored and handled in non-linear segments. For example, polymers such as poly(lactide)-co-(caprolactone) provide attractive elastic properties and dissolution behavior, and may simultaneously enhance the coilability, melt strength, and debinding behavior of the media, thus providing a useful primary binder in a binder system of a MIM/FFF build material.

In another aspect, the primary binder may be composed of a polymer that is physically cross-linked (as opposed to covalently cross-linked), but whose physical crosslinks dissolve in the presence of a suitable solvent, thereby achieving a high effective molecular weight during handling, coiling, and printing, but a lower molecular weight during the debinding step. One example of this are copolymers containing styrene blocks. The crystalline styrene blocks dissolve in acetone (among other solvents), effectively undoing the cross-linkings when exposed to a solution. Note that this is an especially effective chemistry, as thermoplastic elastomers with good elastic properties (for coiling, handling) are typically physically crosslinked, many of them via crystalline styrene domains. Such a primary binder may be quickly and easily debound using a solvent suitable for both the crystalline domains and the flexible chains connecting them.

Other general polymer chemistries provide useful pathways to a media that is suitable for FFF processes (sufficient elasticity for spooling, high melt strength). For example, polyethylene glycol (PEG) is an ester that can hydrolyze via:

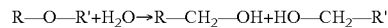

This mechanism provides a useful pathway for accelerating debinding of PEG-PMMA (where PMMA is poly (methyl methacrylate), also known as acrylic) binders to achieve a primary binder with high melt strength and rapid, safe debind.

Similarly, urethane esters can be hydrolyzed according to:
Urethanes:

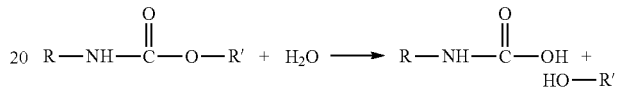

This is another example of a thermoplastic elastomer that can be hydrolyzed and solvent debound while exhibiting superior melt strength and extensional viscosity.

Anhydrides hydrolyze faster than many other polymers, and thus may be particularly effective for fast debinding in a hydrolysis-based debinding process. Polyanhydrides are regularly used in a medical context to degrade in-vivo because the reaction products are generally biocompatible and non-toxic. These polymers are similarly suitable for debinding in a home or office context. A useful primary binder system may be engineered from a copolymer containing anhydride groups interspersed with a second species to tailor the thermoplastic/rheological properties of the polymer as well as its decomposition and dissolution kinetics.

Polyamides degrade in the presence of acids (e.g. nylon, etc.). In general, a polyamide-polyester copolymer may be used as a thermoplastic elastomer that is hydrolytically solvent-debindable. More generally, the rates of hydrolysis for various polymers are (from fastest to slowest): anhydride>ester>amide>ether. This hierarchy may be used to select rapidly hydrolysable binders for use in a polymer binder system as contemplated herein.

Thus, there is generally disclosed herein a powder metallurgical build material for use in a fused filament fabrication system, the material including a powdered metal composition, a secondary binder for retaining a shape of the material during a sintering process, and a primary binder, the primary binder including a high molecular weight polymer selected for chemical debinding with non-hazardous materials.

The high molecular weight polymer may include a polymer that is physically cross-linked to achieve high effective molecular weight. The physical cross-links may include crystalline styrene blocks. The debinding process may include dissolution of the physical cross-links in acetone.

The primary binder may, for example, include a thermoplastic saccharide, polylactic acid, polyglycolic acid, poly(lactide)-co-(caprolactone), copolymers containing styrene blocks, polyethylene glycol, PEG-PMMA, a urethane ester, a polyanhydride, or a copolymer of any of the above constituents.

The reactive debinding may include chemical decomposition in an aqueous solution or hydrolyzation in an aqueous solution. The reactive debinding may include decomposition into monomers in an acidic solution. The reactive debinding may include decomposition in an alkaline solution. The reactive debinding may include dissolving physical cross links with a solvent.

The reactive debinding may produce a waste stream consisting of aqueous monosaccharides.

Figure 11:
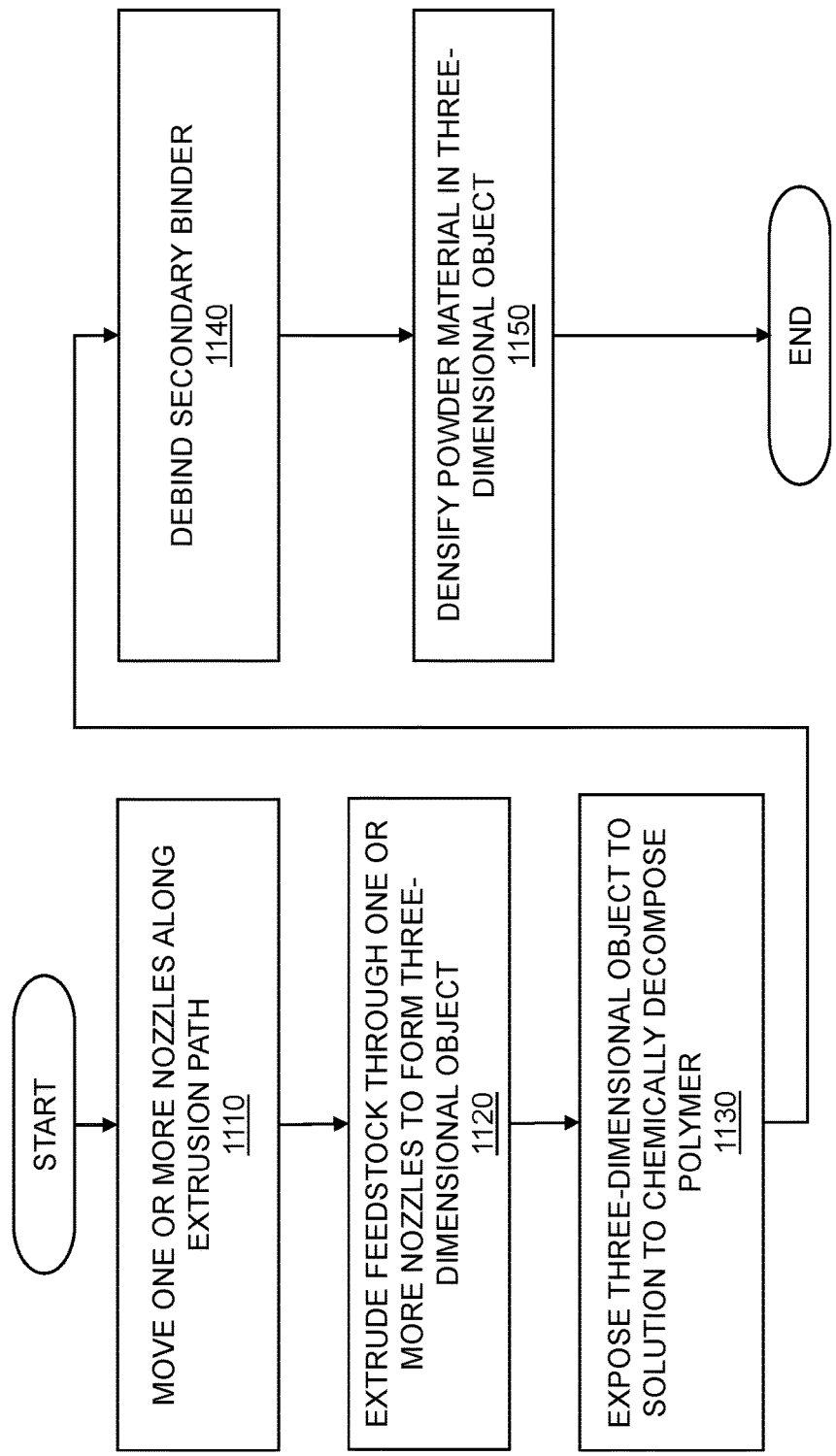
FIG. 11 is a flow chart of an exemplary method of additive manufacturing with a feedstock including a chemically decomposable high molecular weight polymer as a component of a primary binder of a binder system.

FIG. 11 is a flow chart of an exemplary method 1100 of additive manufacturing with a feedstock including a chemically decomposable high molecular weight polymer as a component of a primary binder of a binder system. In general, unless otherwise specified or made clear from the context, the exemplary method 1100 may be carried out using any one or more of the feedstocks described above, with the feedstock including a chemically decomposable high molecular weight polymer as a component of a primary binder system.

As shown in step 1110, the exemplary method 1100 may include moving one or more nozzles along an extrusion path relative to a build plate. The one or more nozzles can be moved along the extrusion path relative to the build plate according to any one or more of the techniques described herein and, thus, may include computer-controlled movement of the one or more nozzles, the build plate, or a combination thereof. Further or instead, such movement may be carried out using any one or more of the devices and systems described herein.

As shown in step 1120, the exemplary method 1100 may include extruding a feedstock through the one or more nozzles. The feedstock may include a binder system and a powder material dispersed in the binder system, as described in greater detail below. Unless otherwise specified or made clear from the context, it should be appreciated that the powder material can be any one or more of the powder materials described herein and, more generally, can be any powder material usefully formable into a dense, final part.

The extrusion of the feedstock may form a three-dimensional object along the extrusion path. It should be appreciated, therefore, that the three-dimensional object formed by extrusion of the feedstock may be collectively formed by a plurality of extruded layers (e.g., with each layer coupled to at least one other layer). Further, because each layer is formed through extrusion of the feedstock, it should be appreciated that each layer includes a powder material, a primary binder of the binder system, and a secondary binder of the binder system. As described in greater detail below, at least one component of the primary binder may be chemically decomposable in the presence of a solvent in which the secondary binder is less soluble than the primary binder such that the primary binder and the secondary binder may be separately removable from the three-dimensional object as the three-dimensional object is processed to form a final part. It is noted that the solvent may be the reactant through which the chemical decomposition takes place, or may contain other reactants that take part in the decomposition reaction, and may generally contain catalysts to adjust the decomposition kinetics.

As shown in step 1130, the exemplary method 1100 may include exposing the three-dimensional object to a chemical solution (e.g., a solvent). In particular, the primary binder may include a moderate-to-high molecular weight polymer chemically decomposable in the solvent during dissolution of at least a portion of the primary binder from the three-dimensional object and, thus, removable from the three-dimensional object in a waste stream (e.g., a waste stream including aqueous monosaccharides). As used herein, a high molecular weight polymer should be understood to be a polymer having a molecular weight of greater than about 100,000 g/mol and, correspondingly, a low molecular weight polymer should be understood to be a polymer having a molecular weight greater than 10,000 g/mol and less than 100,000 g/mol, with waxes and oligomers having molecular weights less than 10,000 g/mol.

The moderate-to-high molecular weight polymer may include any one or more of the high molecular weight binders described herein as being chemically decomposable in a solvent and, in particular, in a non-hazardous solvent. Accordingly, the high molecular weight polymer may include a physically cross-linked polymer (e.g., a polymer including physically cross-linked crystalline styrene blocks). Further, or instead, the high molecular weight polymer of the primary binder may include at least one of a thermoplastic saccharide, polylactic acid, polyglycolic acid, poly(lactide)-co-(caprolactone), copolymers containing styrene blocks, polyethylene glycol, PEG-PMMA, a urethane ester, and a polyanhydride. Further, or instead, the high molecular weight polymer may be chemically decomposable in one or more of an aqueous solution or an alkaline solution. In certain implementations, the chemical solution may be an aqueous solution and the high molecular weight polymer may be hydrolysable in an aqueous solution. In some implementations, the high molecular weight polymer may be chemically decomposable (e.g., into monomers) in an acidic solution.

In general, as compared to low molecular weight polymers, waxes, and/or oligomers, the moderate-to-high molecular weight polymer of the primary binder should be understood to impart certain desirable characteristics to the primary binder to facilitate better print quality. For example, as compared to low molecular weight polymers and as described above, the high molecular weight polymer may have a higher melt strength useful for improving print quality. However, without chemical decomposition, the debind rate of the high molecular weight polymer may be long. Accordingly, chemical decomposition of the high molecular weight polymer may be useful for achieving shorter debind times and, thus, faster fabrication.

In the solvent, the secondary binder may be less soluble than the high molecular weight polymer and, in certain instances, the secondary binder may be substantially insoluble in the solvent. As used herein, substantial insolubility of the secondary binder in the solvent shall be understood to include total insolubility as well as low amounts of solubility (e.g., less than about 5 percent by mass of the secondary binder dissolving in the solvent as the three-dimensional object is exposed to the solvent). With the difference in solubility of the high molecular weight polymer and the secondary binder in the solvent, it should be understood that the secondary binder may support a shape of the three-dimensional object as the high molecular weight polymer is chemically decomposed, during a chemical dissolution of at least a portion of the primary binder, for removal from the three-dimensional object.

In certain instances, the primary binder may further include a wax soluble in the solvent as the three-dimensional object is exposed to the solvent. Such wax may be useful for imparting a desirable viscosity to the binder system to facilitate extrusion of the feedstock. It should be more generally understood that the primary binder may additionally or alternatively include any one or more additives useful for imparting a desired physicochemical property to the feedstock.

As shown in step 1140, the exemplary method 1100 may include debinding the secondary binder from the three-dimensional object. The secondary bindery may include a second polymer, the second polymer having a molecular weight less than or about equal to a molecular weight of the high molecular weight polymer such that the second polymer may provide support structural support to the three-dimensional object as the three-dimensional object is processed to form a dense, final part. In general, the secondary binder may be debound from the three-dimensional object through any one or more of various different debinding processes (e.g., any one or more of chemical debinding, supercritical debinding, wick debinding, catalytic debinding, or thermal debinding).

As shown in step 1150, the exemplary method 1100 may include densifying the powder material in the three-dimensional object to form a final part. Densification of the powder material may include sintering and/or infiltration of the three-dimensional object with a liquid metal.

Figure 12:
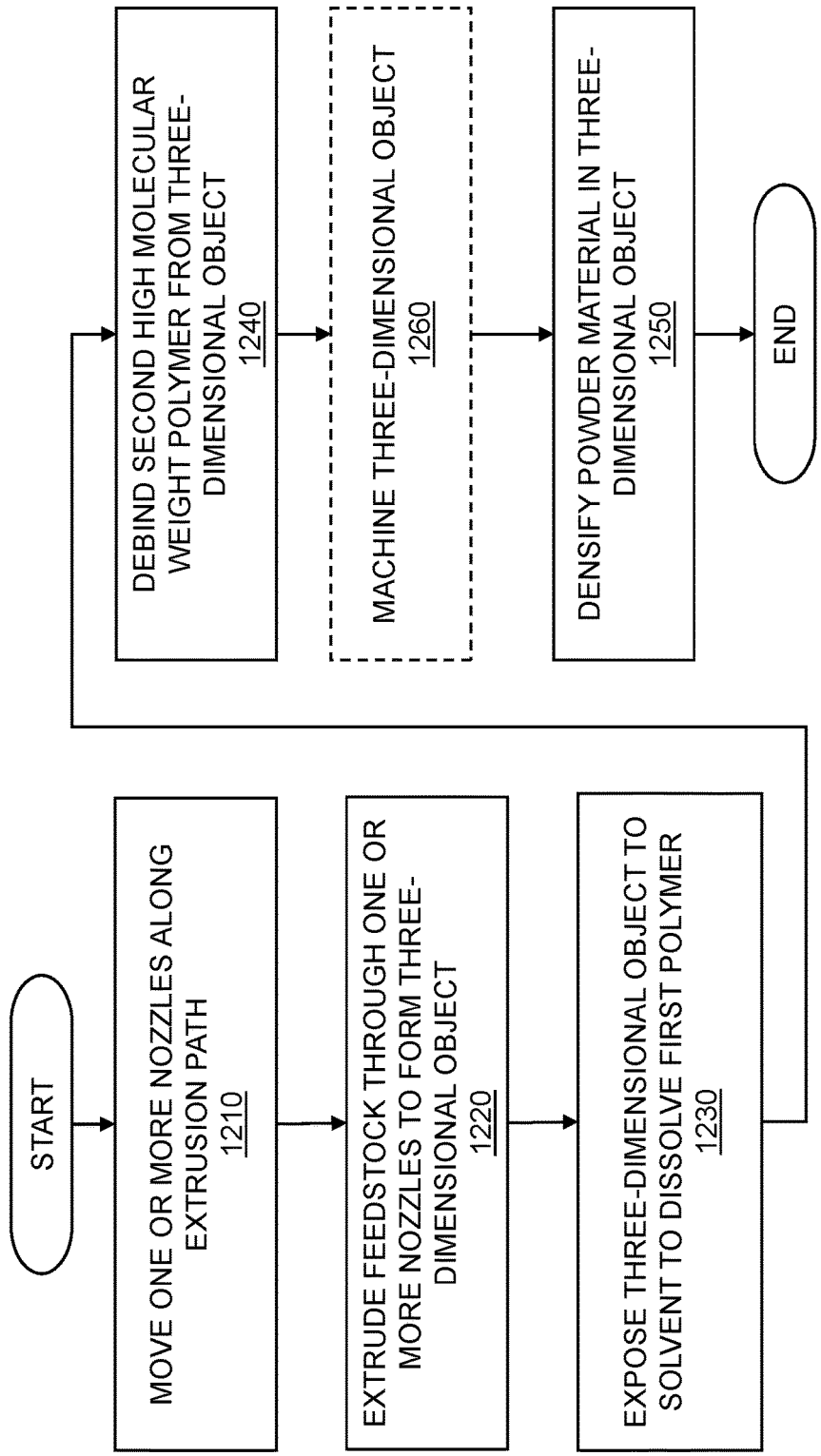
FIG. 12 is a flow chart of an exemplary method of additive manufacturing with a feedstock including a dissolvable high molecular weight polymer as a component of a primary binder of a binder system.

FIG. 12 is a flow chart of an exemplary method 1200 of additive manufacturing with a feedstock including a powder material (e.g., any one or more of the powder materials described herein and in any concentration described herein) dispersed in a primary binder and a secondary binder, with the primary binder including a dissolvable high molecular weight polymer as a component of a primary binder of a binder system. The primary binder may include a first molecular weight polymer, secondary binder may include a second high molecular weight polymer, and the first high molecular weight polymer may be preferentially dissolvable in a solvent to selectively remove the first high molecular weight polymer in a primary debind step applied to a three-dimensional object. Thus, the first high molecular weight polymer may provide structural support to a three-dimensional object while the dissolving of the high molecular weight polymer facilitates rapidly debinding the primary binder from the three-dimensional object.

The first high molecular weight polymer suitable for use with the exemplary method 1200 may be any of various different high molecular weight polymers dissolvable in a solvent, such as a non-hazardous solvent, and suitable for extrusion and providing structural support to a three-dimensional object formed by the extrusion. As an example, the first high molecular weight polymer may include polystyrene. Further, or instead, the first high molecular weight polymer may include one or more of poly(vinyl alcohol) or polyethylene glycol. As an additional or alternative example, the first high molecular weight polymer may include poly methyl methacrylate.

The second high molecular weight polymer suitable for use with the exemplary method 1200 may be any polymer that has a solubility in the solvent that is less than a solubility of the first high molecular weight polymer in the solvent. In certain implementations, the second high molecular weight polymer may include one or more of poly(vinyl butyral), polypropylene, polyethylene, or poly(methyl methacrylate).

In general, the first high molecular weight polymer and the second high molecular weight polymer may each have a respective melt temperature greater than about 60 degrees Celsius. Such melt temperatures are generally above melt temperatures of wax or other additives that may be included in the binder system. Thus, for example, such melt temperatures may be useful for reducing the likelihood of deformation or other similar damage to the feedstock under extreme conditions associated with storage, transportation, or handling.

In certain implementations, the binder system may include the first high molecular weight polymer in a weight percentage of about 30 percent to about 70 percent. Such percentage of the first high molecular weight polymer in the binder system may be useful for achieving a balance between competing considerations associated with providing suitable support to the three-dimensional object while achieving suitable viscosity of the feedstock being extruded. Further, or instead, the binder system may include at least one additive suitable for achieving one or more physicochemical properties in combination with the first high molecular weight polymer and the second high molecular weight polymer. For example, the at least one additive may be less viscous than each of the first high molecular weight polymer and the second high molecular weight polymer to achieve viscosity suitable for extrusion of the feedstock. Such an additive may include a wax and, further or instead, the wax may have a weight percentage greater than or equal to a weight percentage of the first high molecular weight polymer in the binder system. It should be appreciated, however, that other concentrations of wax in the binder system may be useful for achieving a target viscosity. Further, or instead, the additive may include a low molecular weight polymer. As an additional or alternative example, the additive may include any one of stearic acid, ethylene-vinyl acetate (EVA), and linoleic acid.

As shown in step 1210, the exemplary method 1200 may include moving one or more nozzles along an extrusion path relative to a build plate and, as shown in step 1220, the exemplary method 1200 may include extruding feedstock through the one or more nozzles. Unless otherwise specified or made clear from the context, it should be appreciated that the steps 1210 and 1220 are analogous to steps 1110 and 11120 described above with respect to FIG. 11.

As shown in step 1230, the exemplary method 1200 may include exposing the three-dimensional object to a solvent (e.g., immersing the three-dimensional object in a bath of the solvent). The solvent may preferentially dissolve the first high molecular weight polymer relative to the second high molecular weight polymer such that exposure of the three-dimensional object to the solvent may effectively debind the first high molecular weight polymer from the three-dimensional object, leaving the second high molecular weight polymer supporting the three-dimensional object. For example, the second high molecular weight polymer may be insoluble in the solvent as the solvent dissolves the first high molecular weight polymer.

The solvent may be any solvent suitable for preferentially dissolving the first high molecular weight polymer relative to the second high molecular weight polymer. Thus, depending on the composition of the first high molecular weight polymer and the second high molecular weight polymer, the solvent may include one or more of an aliphatic hydrocarbon, ethyl acetate, acetone, methyl ethyl ketone, trans-dichloroethylene, benzene, or toluene. Further, or instead, the solvent may include water. Still further or instead, the solvent may include any one or more of 1,4 dioxane, ethyl acetate, benzene, dimethylformamide, or cyclohexanone.

As shown in step 1240, the exemplary method 1200 may include debinding the second high molecular weight polymer from the three-dimensional object. For example, exposing the three-dimensional object to the solvent may form an open pore structure in the three-dimensional object, and debinding the second high molecular weight polymer may include removing at least a portion of the second high molecular weight polymer through the open pore structure in the three-dimensional object.

As shown in step 1250, the exemplary method 1200 may include densifying the powder material in the three-dimensional object to form a final part. Unless otherwise specified, or made clear from the context, the step 1250 should be understood to be the same as the analogous step 1150 described above with respect to FIG. 11.

As shown in step 1260, the exemplary method 1200 may optionally include machining the three-dimensional object prior to the step 1250 of densifying the three-dimensional object. That is, the secondary binder may provide support to the three-dimensional object such that machining does not unintentionally alter a shape of the three-dimensional object.

The spatial distribution of a binder will now be discussed.

Figure 13:
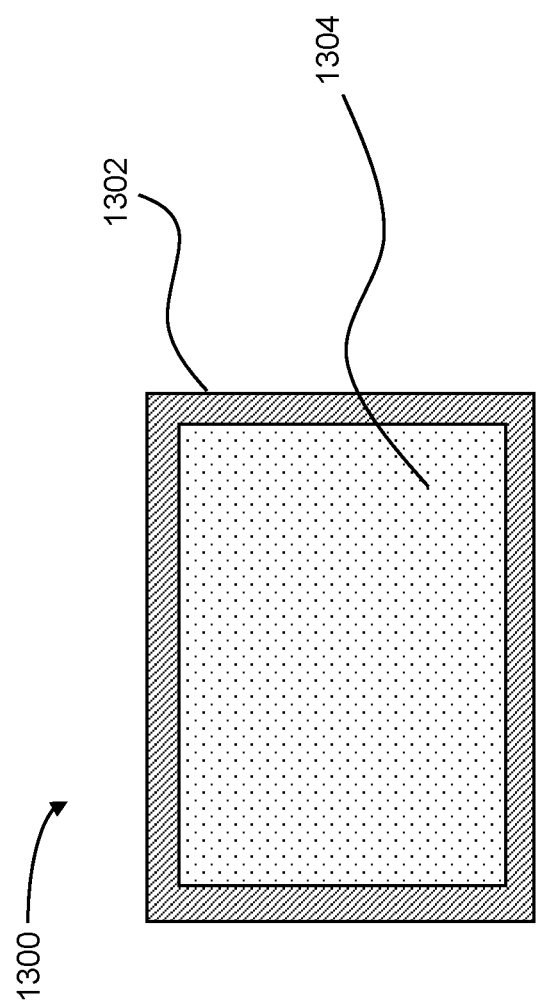
FIG. 13 is a cross-sectional side view of a three-dimensional object including a spatial gradient of a first primary binder of a first binder system relative to a second primary binder of a second binder system.

While certain challenges associated with extrusion of feedstock for additive manufacturing of high quality dense parts (e.g., metal and/or ceramic parts) while achieving suitable debinding times have been addressed in terms of composition of the feedstock, additional or alternative solutions to such challenges are possible. For example, referring now to FIG. 13, a three-dimensional object 1300 is a green part including a spatial gradient of a first binder system 1302 relative to a second binder system 1304. As described in greater detail below, material of the first binder system 1302 may be placed along areas requiring structural support and/or requiring high print resolution while material of the second binder system 1304 may be placed along areas requiring less structural support and/or lower print resolution. The second binder system 1304 may have a higher debind rate than the first binder system 1302 such that, as compared to a part formed only from the first binder system 1302, the three-dimensional object 1300 may have a faster debind time.

Figure 14:
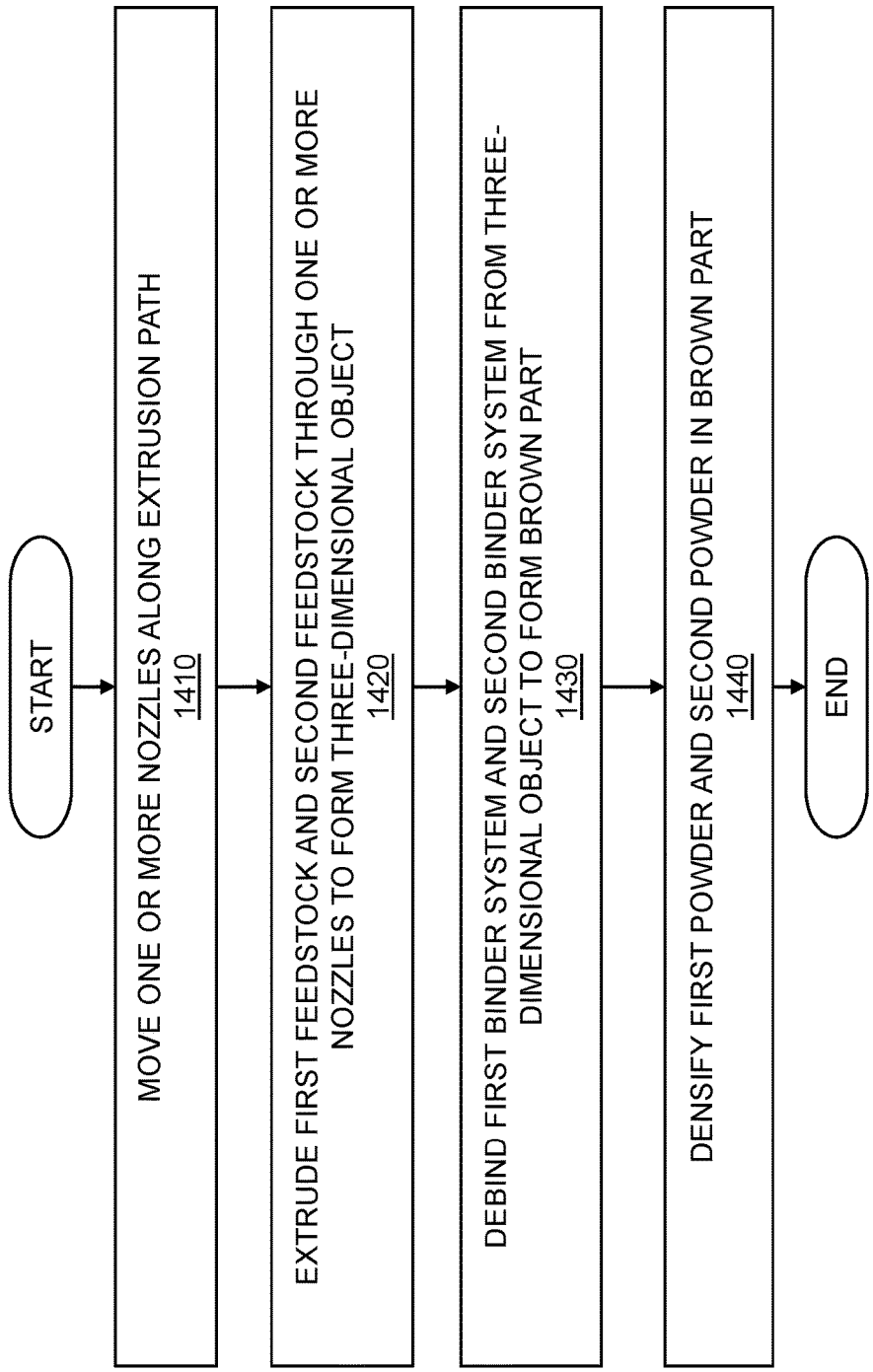
FIG. 14 is a flow chart of an exemplary method for additive manufacturing of a three-dimensional object having a spatial distribution of at least one component of a first binder system relative to at least one component of a second binder system.

FIG. 14 is a flow chart of an exemplary method 1400 for additive manufacturing a three-dimensional object having a spatial distribution of at least one component of a first binder system relative to at least one component of a second binder system. Unless otherwise specified or made clear from the context, it should be understood that the exemplary method 1400 may be carried out to form the three-dimensional object 1300 described above with respect to FIG. 13.

As shown in step 1410, the exemplary method 1400 may include moving one or more nozzles along an extrusion path relative to a build plate. Unless otherwise specified or made clear from the context, it should be appreciated that the step 1410 is analogous to the steps 1110 and 1210 described above with respect to FIG. 11 and FIG. 12, respectively.

As shown in step 1420, the exemplary method 1400 may include extruding a first feedstock and a second feedstock through one or more nozzles. The first feedstock may include a first powder dispersed in a first binder system, and the second feedstock may include a second powder dispersed in a second binder system. Extrusion of the first feedstock and the second feedstock, along the extrusion path, may form a three-dimensional object having a spatial gradient of at least one component of the first binder system relative to at least one component of the second binder system. More specifically, the three-dimensional object may have a spatial gradient of a first primary binder of the first binder system relative to a second primary binder of the second binder system.

The first primary binder may have a first molecular weight, the second primary binder may have a second molecular weight different from the first molecular weight. For example, the first molecular weight of the first primary binder may be great than the second molecular weight of the second primary binder. Because higher molecular weight materials have lower debind rates, it should be understood that the first primary binder may have a lower debind rate than a debind rate of the second primary binder. Further, because higher molecular weight is generally associated with higher melt strength, it should be appreciated that the first primary binder may provide higher print resolution and/or improved structural support as compared to the second primary binder. Accordingly, the spatial gradient of the first primary binder and the second primary binder along the three-dimensional object may be useful for realizing the respective advantages of each primary binder while limiting the respective drawbacks of each primary binder. As a specific example, the first primary binder may include polystyrene. Further, or instead, the second primary binder may include one or more of naphthalene, olive oil, or paraffin wax.

In general, the spatial gradient of the first primary binder relative to the second primary binder may include any of various different non-homogenous distributions of a volumetric concentration of the first primary binder relative a volumetric concentration to the second primary binder. Thus, as used herein, a spatial gradient shall be understood to include gradual variations of the relative volumetric concentration of the first primary binder relative to the second primary binder along the three-dimensional object, step-changes in distribution in a concentration of the first primary binder relative to a concentration of the second primary binder along the three-dimensional object, and combinations thereof. As an example, a volumetric concentration of the first primary binder on an outer portion of the three-dimensional object may be greater than a volumetric concentration of the first primary binder on an inner portion of the three-dimensional object. As a more specific example, the inner portion of the three-dimensional object may be substantially free of the first primary binder. Further, or instead, the outer portion of the three-dimensional object may be substantially free of the second primary binder. Other distributions are additionally or alternatively possible and, more generally, the first primary binder may be present in a higher concentration along those portions of the three-dimensional object benefitting from increased print resolution and/or improved structural support.

The first binder system and the second binder system may each include a respective secondary binder. In certain implementations, the first binder system may include a secondary binder having a composition differing from a composition of a secondary binder of the second binder system. In some implementations, however, the secondary binder of the first binder system may have substantially the same composition as the secondary binder of the second binder system. In this context, substantially the same composition shall be understood to account for variations within typical tolerance levels associated with the material of the secondary binder.

As shown in step 1430, the exemplary method 1400 may include debinding the first binder system and the second binder system from the three-dimensional object to form a brown part. Debinding the first binder system and the second binder system from the three-dimensional object may include, for example, exposing the three-dimensional object to one or more solvents to remove at least a portion of one or both of the first primary binder and the second primary binder from the three-dimensional object. Combinations of solvents and primary binders dissolvable in such solvents may include any such combinations described herein. Further or instead, debinding the first binder system and the second binder system from the three-dimensional object may include thermally processing the three-dimensional object to remove at last a portion of each respective secondary binder from the three-dimensional object.

In certain implementations, the second primary binder of the second binder system may include a readily evaporable material. Examples of such readily evaporable material include one or more of olive oil, naphthalene, or a low melting point paraffin wax (e.g., with a melting point less than about 60 degrees C.). In instances in which the second primary binder of the second binder system is readily evaporable, debinding the second binder system from the three-dimensional object may include evaporating the second primary binder from the three-dimensional object. In general, such evaporation occurs quickly and, thus, may offer advantages with respect to the speed with which a high-quality part may be formed.

As shown in step 1440, the exemplary method 1400 may include densifying the first powder and the second powder in the brown part to form a final part. Unless otherwise specified or made clear from the context, the step 1440 of densifying the first powder and the second powder in the brown part should be understood to be substantially analogous to the step 1150 and the step 1250 described above with respect to FIGS. 11 and 12, respectively. In general, the first powder and the second powder can be any one or more of the powders described herein and, thus, may include one or more of a metal, a metal alloy, or a ceramic. Further, or instead, it should be understood that a composition of the first powder may be substantially the same as the composition of the second powder. As used in this context, substantially the same composition of the first powder and the second powder should be understood to be the same to within typical production tolerances for producing powdered material.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A feedstock for additive manufacturing, the feedstock comprising:
a core including a binder system and a powder material suspended in the binder system, the powder material including a sinterable powder, the binder system including a primary binder and a secondary binder, a net shape of the powder material retainable by the primary binder during a primary debind process, a net shape of the powder material retainable by the secondary binder during a thermal sintering cycle, and at least one of the primary binder and the secondary binder including a first polymer; and
a jacket about the core, the jacket including a second polymer, and the jacket having a mechanical performance greater than a mechanical performance of the core at a temperature substantially below an extrusion temperature for the feedstock.

2. The feedstock of claim 1, wherein the mechanical performance of the core and jacket is measured by any one of the: area under a curve of a stress-strain test, a Shore hardness, a Rockwell hardness, an Izod impact energy, a Charpy impact energy, and a tensile yield strength, and a tensile ultimate strength.

3. The feedstock of claim 1, wherein the powder material has a concentration in the core within ±10 volume percent of a tap density of the powder material.

4. The feedstock of claim 1, wherein the second polymer has a molecular weight greater than a molecular weight of the first polymer.

5. The feedstock of claim 1, wherein the binder system includes two or more polymers, and wherein the second polymer has a molecular weight greater than an average of the molecular weights of the two or more polymers in the binder system.

6. The feedstock of claim 1, wherein the binder system includes the second polymer.

7. The feedstock of claim 1 wherein the second polymer has a Shore D hardness greater than a Shore D hardness of the first polymer at the temperature substantially below the extrusion temperature of the feedstock.

8. The feedstock of claim 1, wherein the second polymer has a melt temperature higher than a melt temperature of the first polymer.

9. The feedstock of claim 1, wherein, at a temperature of about twenty-three degrees Celsius, the feedstock is spoolable without fracture on a spool with a diameter of at most thirty-six inches and at least about a diameter of the feedstock.

10. The feedstock of claim 1, wherein, at a temperature of about twenty-three degrees Celsius, the feedstock is substantially rigid.

11. The feedstock of claim 1, wherein the second polymer of the jacket has a polymer chain longer than a polymer chain of the first polymer of the binder system.

12. The feedstock of claim 1, wherein the jacket contains an amount of the powder material.

13. The feedstock of claim 12, wherein a volumetric percentage of the powder material in the jacket is less than a volumetric percentage of the powder material in the core.

14. The feedstock of claim 13, wherein a volumetric percentage of the powder material in the jacket is substantially equal to a volumetric percentage of the powder material in the core.

15. The feedstock of claim 13, wherein the secondary binder is formed in part by the second polymer, and a volumetric percentage of the second polymer in the jacket is greater than a volumetric percentage of the second polymer in the core.

16. The feedstock of claim 1, wherein the first polymer is polystyrene.

17. The feedstock of claim 1, wherein the second polymer is one or more of polystyrene, polypropylene, polyethylene, and poly(methyl methacrylate).

18. The feedstock of claim 1, wherein the secondary binder includes one or more of polypropylene, polyethylene, and poly(methyl methacrylate).

19. A method of fabricating a feedstock, the method comprising:
extruding a continuous core including a binder system and a powder material, the powder material having a concentration in the continuous core within ±10 volume percent of a tap density of the powder material, the binder system including a primary binder and a secondary binder, a net shape of the powder material retainable by the primary binder during a primary debind process, and a net shape of the powder material retainable by the secondary binder during a thermal sintering cycle, at least one of the primary binder and the secondary binder including a first polymer, and the powder of the powder material including a sinterable powder; and
forming a jacket of a jacket material about the continuous core.

20. The method of claim 19, wherein, at about twenty-three degrees Celsius, the jacket material has a Shore hardness greater than a Shore hardness of the continuous core.

21. The method of claim 19, wherein the binder system includes a low molecular weight polymer, the jacket includes a crosslinker for the low molecular weight polymer, and a polymerization of the low molecular weight polymer is triggerable by the crosslinker to form longer chain polymers at an extrusion temperature for the feedstock.

22. The method of claim 21, wherein the low molecular weight polymer has a molecular weight no greater than one hundred thousand g/mol.

23. The method of claim 21, wherein the extrusion temperature is at least one hundred degrees Celsius.

24. The method of claim 19, wherein forming the jacket includes coextruding the jacket material around the continuous core.

25. The method of claim 19, wherein forming the jacket includes spraying the jacket material onto the continuous core or dipping the continuous core in the jacket material.

* * * * *